(12) United States Patent
Taylor et al.

(10) Patent No.: US 12,280,726 B2
(45) Date of Patent: Apr. 22, 2025

(54) POWER TRACK ASSEMBLY AND ACCESSORY BASE THEREFORE

(71) Applicant: Dometic Sweden AB, Solna (SE)

(72) Inventors: Brent Alan Taylor, Auburn, IN (US); Clayton Hendry Meyers, Middlebury, IN (US); Kent A. Becker, Huntertown, IN (US)

(73) Assignee: Dometic Sweden AB, Solna (SE)

( * ) Notice: Subject to any disclaimer, the term of this patent is extended or adjusted under 35 U.S.C. 154(b) by 495 days.

(21) Appl. No.: 16/910,531

(22) Filed: Jun. 24, 2020

(65) Prior Publication Data

US 2020/0317145 A1    Oct. 8, 2020

Related U.S. Application Data

(60) Division of application No. 15/311,131, filed as application No. PCT/US2015/031206 on May 15, (Continued)

(51) Int. Cl.
*E04F 10/06* (2006.01)
*B60R 16/027* (2006.01)
(Continued)

(52) U.S. Cl.
CPC ........ *B60R 16/027* (2013.01); *E04F 10/0603* (2013.01); *E04F 10/0607* (2013.01);
(Continued)

(58) Field of Classification Search
CPC .............. E04F 10/0603; E04F 10/0611; E04F 10/0607; E04F 10/0614; E04F 10/0625;
(Continued)

(56) References Cited

U.S. PATENT DOCUMENTS 3,847,171 A    11/1974  Akers et al.
3,955,611 A     5/1976  Coles et al.
(Continued)

FOREIGN PATENT DOCUMENTS

AU         366561         1/2016
AU         366562         1/2016
(Continued)

OTHER PUBLICATIONS

European Patent Office, EP Extended European Search Report for EP15793333.4 dated May 15, 2018.
(Continued)

*Primary Examiner* — Daniel P Cahn
*Assistant Examiner* — Jeremy C Ramsey
(74) *Attorney, Agent, or Firm* — Dinsmore & Shohl LLP

(57) ABSTRACT

An accessory base is provided which may be used with a power track assembly. The accessory base is connected to a power track assembly and a powered accessory so that the powered accessory is powered by the power track. The accessory base may also be used with power tracks in a roller tube awning assembly, a cassette awning assembly, hardware assembly, or a track which may be mounted to a surface.

16 Claims, 25 Drawing Sheets

Related U.S. Application Data 2015, now Pat. No. 10,737,644, which is a continuation-in-part of application No. 14/278,180, filed on May 15, 2014, now Pat. No. 9,695,635.

(60) Provisional application No. 62/084,226, filed on Nov. 25, 2014.

(51) Int. Cl.
  *E04H 15/08* (2006.01)
  *E06B 9/72* (2006.01)
  *B60P 3/36* (2006.01)
  *E06B 9/68* (2006.01)

(52) U.S. Cl.
  CPC ...... *E04F 10/0611* (2013.01); *E04F 10/0614* (2013.01); *E04F 10/0625* (2013.01); *E04F 10/0655* (2013.01); *E04F 10/0659* (2013.01); *E04F 10/0666* (2013.01); *E04F 10/0688* (2013.01); *E04H 15/08* (2013.01); *E06B 9/72* (2013.01); *B60P 3/36* (2013.01); *E04F 10/0644* (2013.01); *E06B 2009/6809* (2013.01)

(58) Field of Classification Search
  CPC .............. E04F 10/0659; E04F 10/0666; E04F 10/0688; E04H 15/08; F21S 8/038; F21S 8/066; F21V 21/34; F21V 17/12; F21V 23/06; H01R 33/06; H01R 25/147; H01R 25/14; H01R 25/142

See application file for complete search history.

(56) References Cited

U.S. PATENT DOCUMENTS

| | | | |
|---|---|---|---|
| 4,159,162 A | | 6/1979 | Christoffel |
| 4,190,309 A | | 2/1980 | Glass |
| 4,417,185 A | | 11/1983 | Bullat |
| 4,446,506 A | | 5/1984 | Larson |
| 4,615,371 A | | 10/1986 | Clauss |
| 4,657,462 A | | 4/1987 | Hoen |
| 4,807,684 A | | 2/1989 | Melton |
| 4,822,292 A | * | 4/1989 | Thayer ................. H01R 25/142 439/115 |
| 4,919,625 A | * | 4/1990 | Coutre ................... H01R 25/14 439/118 |
| 5,010,940 A | | 4/1991 | Marocco |
| 5,148,849 A | | 9/1992 | Faludy |
| 5,180,223 A | | 1/1993 | McNamee |
| 5,197,797 A | | 3/1993 | Jaksich |
| 5,259,774 A | | 11/1993 | Gabrius |
| 5,522,704 A | * | 6/1996 | Casteel ................. H01R 25/142 416/246 |
| 5,577,830 A | | 11/1996 | Barry |
| 5,760,558 A | | 6/1998 | Popat |
| 5,793,174 A | | 8/1998 | Kovach et al. |
| 5,853,294 A | | 12/1998 | Rehder |
| 5,855,485 A | | 1/1999 | Patti |
| 5,934,349 A | * | 8/1999 | Faller ................. E04F 10/0666 160/370.21 |
| 5,984,687 A | | 11/1999 | Schwarz |
| 6,059,582 A | * | 5/2000 | Tsai ..................... H01R 25/147 439/121 |
| 6,089,884 A | | 7/2000 | Klaus |
| 6,230,785 B1 | | 5/2001 | Tokuyama et al. |
| 6,273,172 B1 | | 8/2001 | Frey |
| 6,353,178 B1 | | 3/2002 | Linhart |
| 6,421,175 B1 | | 7/2002 | Shopp |
| 6,489,702 B1 | | 12/2002 | Bartman |
| 6,494,246 B1 | | 12/2002 | Blevins |
| 6,692,135 B2 | | 2/2004 | Li |
| 6,700,246 B1 | | 3/2004 | Bruhn |
| 6,837,255 B2 | | 1/2005 | Bunch et al. |
| 6,843,301 B2 | | 1/2005 | Carrillo et al. |
| 6,983,783 B2 | | 1/2006 | Carmen, Jr. et al. |
| 7,057,360 B1 | | 6/2006 | Hsu |
| 7,061,197 B1 | | 6/2006 | Mullet et al. |
| 7,066,618 B1 | | 6/2006 | Little |
| 7,105,858 B2 | | 9/2006 | Popovich |
| 7,281,560 B2 | | 10/2007 | Hicks et al. |
| 7,311,290 B1 | | 12/2007 | Barnes |
| 7,387,483 B1 | | 6/2008 | Scheurn |
| 7,387,514 B2 | | 6/2008 | Bienert |
| 7,604,015 B2 | | 10/2009 | Fraser |
| 7,723,939 B2 | | 5/2010 | Carmen, Jr. |
| 7,744,386 B1 | | 6/2010 | Speidel et al. |
| 7,748,675 B2 | | 7/2010 | Nestor et al. |
| 7,819,665 B2 | | 10/2010 | Nishizawa |
| 7,821,479 B2 | | 10/2010 | Zhang |
| 7,861,990 B2 | | 1/2011 | Barnes |
| 7,871,017 B2 | | 1/2011 | Van Zutven |
| 7,883,247 B2 | | 2/2011 | Calleja |
| 7,914,198 B2 | | 3/2011 | Mier-Langner et al. |
| 7,890,765 B2 | | 7/2011 | Reitz et al. |
| 8,258,993 B2 | | 9/2012 | Inoue et al. |
| 8,287,284 B1 | | 10/2012 | Nishizawa |
| 8,348,677 B2 | | 1/2013 | Angerpointner et al. |
| 8,368,328 B2 | | 2/2013 | Mullet et al. |
| 8,376,757 B2 | | 2/2013 | Yamamoto et al. |
| 8,418,741 B2 | | 4/2013 | Cheung |
| 8,506,136 B1 | | 8/2013 | Herdt |
| 8,708,877 B2 | | 4/2014 | Kirihara et al. |
| 8,723,454 B2 | | 5/2014 | Skinner et al. |
| 8,776,861 B2 | | 7/2014 | Bohlen et al. |
| 8,887,785 B2 | | 11/2014 | Goth |
| 8,950,460 B2 | | 2/2015 | Worthman et al. |
| 8,960,260 B2 | | 2/2015 | Anderson et al. |
| 9,091,118 B2 | | 7/2015 | Anderson et al. |
| 9,228,359 B2 | | 1/2016 | Taylor |
| 9,291,338 B2 | | 3/2016 | Liu |
| 9,394,743 B2 | | 7/2016 | Mullet et al. |
| 9,695,635 B2 | | 7/2017 | Taylor et al. |
| 10,576,917 B2 | | 3/2020 | Taylor et al. |
| 2004/0020611 A1 | | 2/2004 | Coenraets |
| 2004/0041743 A1 | | 3/2004 | Ling et al. |
| 2004/0129849 A1 | | 7/2004 | Walker et al. |
| 2005/0039861 A1 | | 2/2005 | Faludy et al. |
| 2006/0158045 A1 | | 6/2006 | Speri |
| 2007/0039911 A1 | | 2/2007 | Sator |
| 2007/0193700 A1 | | 8/2007 | Ornelas et al. |
| 2008/0093030 A1 | | 4/2008 | Gutierrez |
| 2008/0128095 A1 | | 6/2008 | Van Zutven |
| 2008/0163989 A1 | | 7/2008 | Sales et al. |
| 2008/0173341 A1 | | 7/2008 | Falin |
| 2008/0192492 A1 | | 8/2008 | Chen |
| 2008/0230192 A1 | | 9/2008 | Kane |
| 2010/0061093 A1 | | 3/2010 | Janssen et al. |
| 2010/0194785 A1 | | 8/2010 | Huitema et al. |
| 2010/0307701 A1 | | 12/2010 | Peterson |
| 2011/0048651 A1 | | 3/2011 | Goth |
| 2011/0048655 A1 | | 3/2011 | Andreasen et al. |
| 2011/0170704 A1 | * | 7/2011 | Smith .................... H04B 3/548 381/77 |
| 2012/0073624 A1 | | 3/2012 | Nocito et al. |
| 2013/0235558 A1 | | 9/2013 | Zhou |
| 2014/0110065 A1 | | 4/2014 | Beland et al. |
| 2014/0142436 A1 | | 5/2014 | Hutchins et al. |
| 2014/0224437 A1 | | 8/2014 | Colson et al. |
| 2014/0262058 A1 | | 9/2014 | Mullet et al. |
| 2014/0305602 A1 | | 10/2014 | Kirby et al. |
| 2015/0034259 A1 | | 2/2015 | Bohlen et al. |
| 2015/0179994 A1 | | 6/2015 | Lemaitre et al. |
| 2015/0330086 A1 | | 11/2015 | Taylor |
| 2015/0330087 A1 | | 11/2015 | Taylor et al. |
| 2016/0104985 A1 | * | 4/2016 | Ewing ................. F21V 33/0012 439/119 |
| 2016/0111862 A1 | | 4/2016 | Taylor |
| 2016/0230460 A1 | | 8/2016 | Colson et al. |

(56) References Cited

U.S. PATENT DOCUMENTS

| | | | |
|---|---|---|---|
| 2017/0073975 A1 | 3/2017 | Taylor et al. | |
| 2017/0088068 A1 | 3/2017 | Taylor et al. | |

FOREIGN PATENT DOCUMENTS

| | | |
|---|---|---|
| BE | 1016946 | 10/2007 |
| CA | 2948854 A1 | 11/2015 |
| CA | 2948856 A1 | 11/2015 |
| CA | 165362 | 6/2016 |
| CA | 165363 | 6/2016 |
| CA | 2948854 | 11/2021 |
| CN | 103147585 | 6/2013 |
| DE | 102010054920 | 6/2011 |
| DE | 202011051085 | 11/2011 |
| DE | 202011051105 | 11/2011 |
| EM | 002861385 | 11/2015 |
| EM | 002861393 | 11/2015 |
| EP | 0859350 A1 | 8/1998 |
| EP | 0916781 | 7/2001 |
| EP | 1396592 | 3/2004 |
| EP | 1484459 | 12/2004 |
| EP | 1785544 | 1/2008 |
| EP | 3145739 A1 | 3/2017 |
| EP | 3145740 A1 | 3/2017 |
| ES | 1103311 U | 3/2014 |
| FR | 2808047 | 10/2001 |
| GB | 2205888 | 12/1988 |
| GR | 1003642 | 8/2001 |
| JP | 06267327 | 9/1994 |
| JP | 2008337118 | 12/1996 |
| KR | 101065173 | 9/2011 |
| KR | 101224491 | 1/2013 |
| KR | 101284733 | 7/2013 |
| WO | 199518898 | 7/1995 |
| WO | 199735146 | 9/1997 |
| WO | 2006056348 | 6/2006 |
| WO | 2013129916 | 9/2013 |
| WO | 2015/175990 A1 | 11/2015 |
| WO | 2015/176013 A1 | 11/2015 |

OTHER PUBLICATIONS

Intention to Grant mailed in EP Patent Application No. 15793465.4 on Oct. 21, 2020.
Final Office Action mailed Nov. 1, 2018 in U.S. Appl. No. 15/311,110.
Notice of Allowance mailed Apr. 3, 2019 in U.S. Appl. No. 15/311,110.
Final Office Action mailed Oct. 24, 2019 in U.S. Appl. No. 15/311,131.
Notice of Allowance mailed in U.S. Appl. No. 15/311,131 on Mar. 18, 2020.
Notice of Allowance mailed in U.S. Appl. No. 15/311,131 on May 20, 2020.
Advisory Action mailed Feb. 4, 2020 in U.S. Appl. No. 15/311,131.
Transmittal Letter of Related Cases.
Korean Intellectual Property Office, International Search Report and Written Opinion for PCT/US15/031206 Aug. 24, 2015.
Larson Enterprises "Awna-Roll"; Valley Center, CA [PowerPoint Presentation], 21 pages Jan. 1, 2000.
Welcome to a World of Relaxation Right in Your Backyard, Retractable Awnings, Retractable Window, Patio and Porch Awning Features at http://www.aristocratawnings.com/awnings/retractable-awnings; 5 pages Dec. 28, 2013.
RV Outfitters, Awnings, Awning Accessories Online Catalog at http://www.bellrpg.net/Rvout/RV/group.asp; 11 pages Dec. 28, 2013.
Eclipse Lunar Light Package; Retractable Awnings, Retractable Shades and Solar Shades by Eclipse Awning at http://www.eclipseawning.com/home/products/accessories; eclipse lunar-light-package; 3 pages Dec. 28, 2013.
Korean Intellectual Property Office, International Search Report and Written Opinion for PCT/US15/031175 Aug. 12, 2015.
Korean Intellectual Property Office, International Search Report and Written Opinion of PCT Serial No. PCT/US15/031182 dated Aug. 24, 2015.
LED Light Kit 18-21; Introduction, Description and Price of product at http://www.rvawningsmart.com/LED-Light-Kit-13-21-68205.htm Nov. 14, 2013.
Carefree Thin-Lite Awning Roller Light; Introduction and Description of product at http://www.carefreeofcolorado.com/carefree/products; 2 pages. Nov. 14, 2013.
Canadian Patent Application No. 2,948,559 entitled "Rotatable Awning with Illumination" filed Nov. 8, 2016.
Australian Patent Application No. 2015258913 entitled "Rotatable Awning with Illumination" filed Nov. 8, 2016.
Canadian Patent Application No. 2,948,854 entitled "Power Track Awning Assembly" filed Nov. 10, 2016.
European Patent Application No. 15 793 333.4 entitled "Power Track Awning Assembly" filed Dec. 8, 2016.
Canadian Patent Application No. 2,948,856 entitled "Power Track Assembly and Accessory Base Therefore" filed Nov. 10, 2016.
European Patent Application No. 15 793 465.4 entitled "Power Track Assembly and Accessory Base Therefore" filed Dec. 13, 2016.
Design U.S. Appl. No. 29/527,177 entitled "Accessory Base" filed May 15, 2015.
Design U.S. Appl. No. 29/527,180 entitled "Accessory Base" filed May 15, 2015.
Intention to Grant mailed in EP Patent Application No. 15793465.4 on Apr. 13, 2021.
Office Action mailed in EP Patent Application No. 15793333.4 on Apr. 14, 2021.
European Patents Office, EP Communication for EP15793333.4 dated Feb. 20, 2018.
Canadian Intellectual Property Office Notice of Allowance in app. No. 2,948,854 dated Jun. 18, 2021.
Canadian Intellectual Property Office Office Action in app. No. 2,948,856 dated Jun. 23, 2021.
Decision to Grant Mailed in EP Patent Application No. 15793465.4 mailed on Aug. 2, 2021.
Canadian Intellectual Property Office Office Action in app. No. 2,948,856 dated Nov. 29, 2021.
Notice of Allowance mailed in U.S. Appl. No. 15/311,110 on Sep. 16, 2019.
United States Patent and Trademark Office, Office Action for U.S. Appl. No. 15/311,110 dated Mar. 8, 2018.
Extended European Search Report For European Application No. 15793465.4 mailed Mar. 5, 2018.
Notice of Allowance in Canada Patent Application No. 2948856 mailed on Jul. 27, 2022.
CA Application No. 3176672 titled "Power Track Assembly and Accessory Base Therefore" filed on Sep. 28, 2022.
Office Action mailed in EP Patent Application No. 15793333.4 on May 17, 2023.
Intention to Grant mailed in EP Patent Application No. 15793333.4 on Apr. 9, 2024.
Decision to Grant mailed in EP Patent Application No. 15793333.4 on Aug. 1, 2024.

* cited by examiner

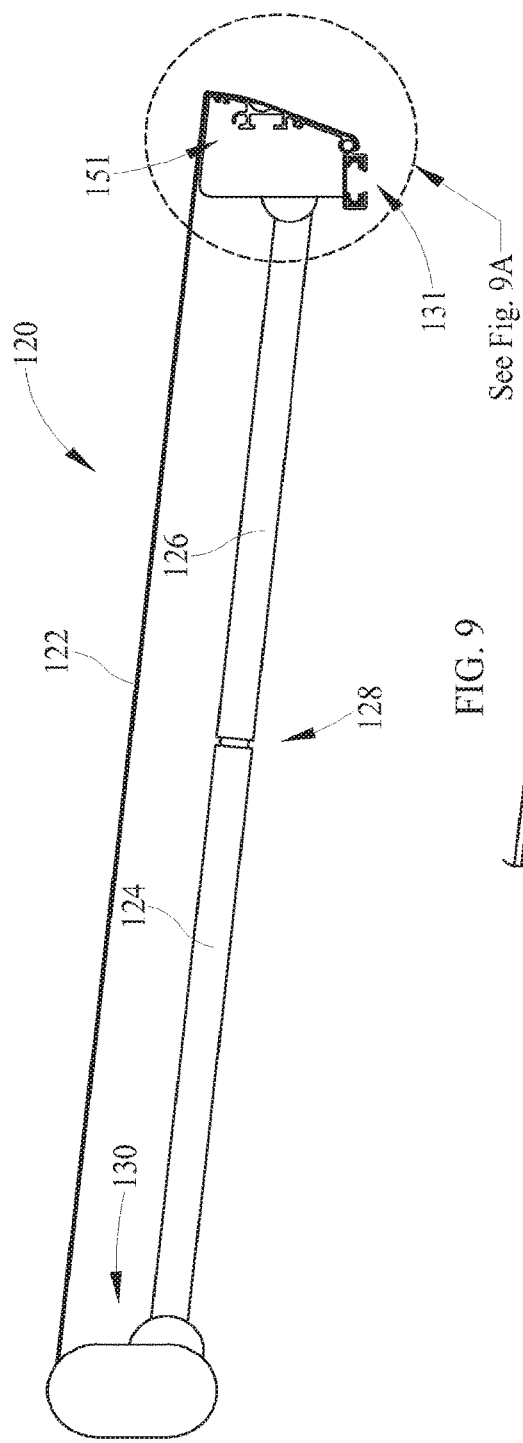
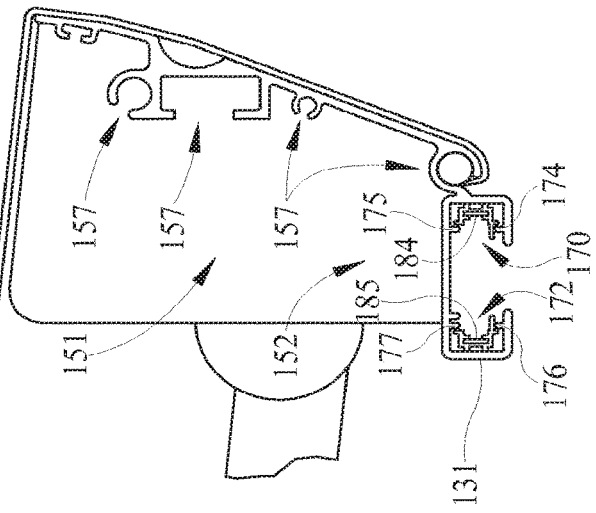
FIG. 9
FIG. 9A

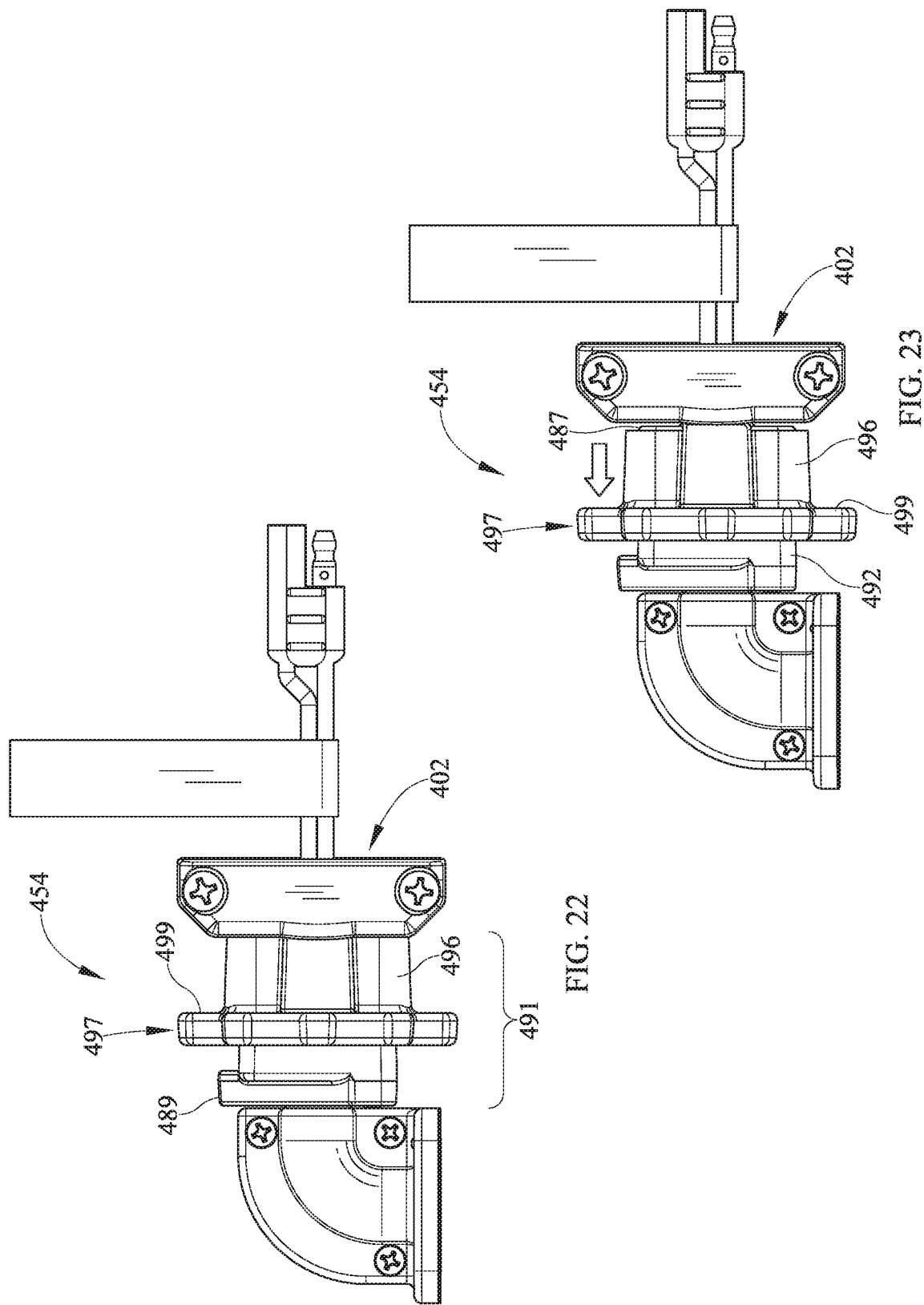

POWER TRACK ASSEMBLY AND ACCESSORY BASE THEREFORE

CLAIM TO PRIORITY

This divisional patent application claims priority to and benefit of, under 35 U.S.C. 121, U.S. National Stage patent application Ser. No. 15/311,131, titled "Power Track Assembly and Accessory Base Therefore", filed Nov. 14, 2016, which claims priority to and benefit of, under 35 U.S.C. 119(a), PCT Application No. PCT/US15/31206, under the same title, filed May 15, 2015, which claims priority to and benefit of U.S. Provisional Patent Application Ser. No. 62/084,226, filed Nov. 25, 2014, titled "Power Track Awning Assembly", and U.S. Non-Provisional patent application Ser. No. 14/278,180, filed May 15, 2014, also titled "Power Track Awning Assembly", all of which is incorporated by reference herein.

BACKGROUND

Field of the Invention

Present embodiments generally pertain to an awning assembly with powered service for electrical accessories. More particularly, present embodiments relate to, without limitation, a rotatable awning assembly with a power track formed in the assembly for connection of various electrically powered accessories.

Description of the Related Art

The use of awnings on recreational vehicles and fixed structures, for example on homes, has increased in part due to a desire to increase the functionality of outdoor living spaces beneath and around these awnings. Various attempts have been made to improve functionality of outdoor living spaces created in part by outdoor awnings. In doing so, a host of problems have arisen.

For example, it would be desirable to use powered accessories in the outdoor living space. However, use of electrically powered accessories has been difficult for a multitude of reasons. One problem has been related to the use of electrical wiring or power cords for the accessories. Some prior art devices have utilized awning hems to conceal wiring from the RV to the extended end of the awning. Other prior art or solutions have utilized separate joist-like structures within the awning framework to position lights once the awning has been extended. Other solutions have involved multiple power cords running to accessories. However, it may not be desirable to run a multitude of wires which may be a tripping hazard or delay storing of the awning for example, if windy conditions or weather changes rapidly.

Additional problems have involved pathways for the wires while accommodating the extension and retraction of the awning assembly. While some attempts have been made to conceal the wire in the awning hem, the rolling of the awning and wire therein may cause undesirable thickening of the awning edges when rolled.

Accordingly, it would be desirable to overcome these and other deficiencies to provide an awning assembly which allows the use of powered accessories to increase the functionality of the outdoor living space provided in part by the awning. It would also be desirable to provide additional function under and around the shaded area of the awning.

The information included in this Background section of the specification, including any references cited herein and any description or discussion thereof, is included for technical reference purposes only and is not to be regarded subject matter by which the scope of the invention is to be bound.

SUMMARY

According to some embodiments, an awning roller assembly is provided. The structure provides an awning roller tube having a first end and a second end with a powered groove extending between the ends, in full or in part. The powered groove includes a plurality of tracks having at least one electrical conductor in each track. An accessory base is provided for connection with a plurality of powered accessories, including but not limited to, lights, fans or audio-video equipment. The accessory base provides electrical connection between the powered groove and the accessory to provide improved function in the outdoor living space beneath and around the awning.

According to some embodiments, the power track awning assembly comprises an awning roller tube and awning canopy which is capable of being wrapped about the awning roller tube as the awning roller tube moves between a first position and a second position, the awning roller tube having a first end and a second end, a power groove extending between the first end and the second end, at least one track having first and second conductors disposed in the power groove, an accessory base disposed in the power groove, the accessory base having a first contact in electrical communication with the at least one track and a second contact in electrical communication with the at least one track.

Optionally, the power track awning assembly further comprising a third contact on the accessory base. An electrical strip may be located in said powered groove and in electrical communication with the third contact. The contact between the third contact and said electrical strip may preclude movement of the awning roller tube. The third contact being one of a spring and a solid contact. The power groove may further have at least one first retainer rib for retaining the at least one track. The power groove may have at least one second retainer rib for retaining a second track. The power track awning assembly may further comprise at least one third locating rib for locating an electrical strip. The at least one track may be formed of co-extruded materials wherein one of the co-extruded materials is electrically conductive. The at least one track may alternatively be formed by adding the conductors to at least one track body during formation of the at least one track body. As a further alternative, the at least one track may be formed by independently forming at least one body and the conductors and subsequently joining said at least one body with said conductors. The power track awning assembly may further comprise an opening extending into the power groove. The accessory base may have a power head. The power head may have a first dimension which is less than a dimension of the opening. The power head may have a second dimension which is greater than a dimension of the opening. The power track awning assembly may further comprise a powered accessory connected to the accessory base. The powered accessory may be at least one of a light, a fan and a speaker. The power track awning assembly may further comprise a rotating conductor allowing electrical wiring to pass between a fixed structure to a rotating structure of the powered awning roller assembly. The power track awning assembly further comprises at least one circuit for providing power to the at least one track of the power groove. The power groove may not be powered when the awning is retracted. Alternatively, the power groove may be powered when the awning is extended.

According to alternative embodiments, a power track awning assembly comprises an awning roller having an awning canopy extending to an awning bar, a plurality of arms are capable of extending and retracting, the plurality of arms are mounted adjacent to the awning roller at a first end and to the awning bar at a second end, an extrusion is connected to the awning bar and having a power groove formed therein, the power groove receiving at least one track having a first conductor and a second conductor, the power groove capable of receiving an accessory base and being in electrical communication with the first and second conductors.

Optionally, the power track awning assembly may further comprise wiring extending between a power source and the extrusion through the plurality of arms. The extrusion having at least one retaining channel. The retaining channel may be capable of mounting the extrusion to the awning bar. The power track awning assembly may further comprise at least one control circuit.

According to some embodiments, a power track awning assembly comprises an awning roller tube and a canopy, the canopy connected to a roller tube at one end, a first hardware assembly and a second hardware assembly at lateral edges of the canopy. At least one of the first hardware assembly and the second hardware assembly may have a power groove, the power groove including at least one track having a first conductor and a second conductor extending through the at least one track.

Optionally, the power groove may receive an accessory base. The accessory base may be in electrical communication with the first and second conductors. The accessory base may be positioned in the power groove. The power track awning assembly may further comprise an accessory in electrical communication with said accessory base. The accessory may be one of a light, a fan, an audio accessory and a video accessory. The power groove may be formed on an extended arm. The power groove may have a plurality of locating ribs. The plurality of locating ribs may engage the at least one track. The at least one track may be two tracks. The power groove may be formed in one of a top arm and a base arm. The hardware component may be an awning arm. The awning arm may be a channel shaped structure. The hardware component may be connected to an awning roller tube. The power track awning assembly may further comprise a power-in feed cover in electrical communication with the at least one track. The awning assembly may comprise a roller tube. The awning assembly may comprise a cassette type awning.

According to some embodiments, a power track awning assembly comprises an awning which is extendably and retractably supported by an awning hardware assembly comprising a plurality of arms, at least one of said arms having a power groove located thereon, at least one track having first and second conductors extending through the power groove, the power groove capable of receiving an accessory base which may be in electrical communication with the conductors.

According to some embodiments, a power track awning assembly comprises an awning roller tube and a canopy, the canopy connected to a roller tube at one end, a first hardware assembly and a second hardware assembly at lateral edges of the canopy, at least one of said first hardware assembly and said second hardware assembly having a power groove, the power groove including at least one track having a first conductor and a second conductor extending through the at least one track.

Optionally, the power groove receives an accessory base. The accessory base may be in electrical communication with the first and second conductors. The accessory base may be positioned in the power groove. The power track awning assembly may further comprise an accessory in electrical communication with the accessory base. The accessory may be one of a light, a fan, an audio accessory and a video accessory. The power groove may be formed on an extended arm. The power groove may have a plurality of locating ribs. The plurality of locating ribs may engage the at least one track. The at least one track may be two tracks. The power groove may be formed in one of a top arm and a base arm. The hardware component may be an awning arm. The awning arm being a channel shaped structure. The hardware component may be connected to an awning roller tube. The power track awning assembly may further comprise a power-in feed cover in electrical communication with the at least one track. The awning assembly may comprise a roller tube. The awning assembly may comprise a cassette type awning.

According to some embodiments, a power track awning assembly comprises an awning which is extendably and retractably supported by an awning hardware assembly comprising a plurality of arms, at least one of the arms may have a power groove located thereon, at least one track having first and second conductors extending through the power groove, the power groove capable of receiving an accessory base which may be in electrical communication with the conductors.

According to some embodiments, an accessory base for use with a powered accessory comprises a flange having a body, a first side and a second side, a first contact and a second contact each having a first end and a second end said first and second contacts extending into the flange. A power head is spaced from the body at the first side of the flange, the first contact and the second contact extends through the power head. The power head has a first dimension and a second dimension wherein one of the first and second dimensions is capable of fitting into a power groove of an adjacent component and the other of the first and second dimensions is capable of retaining the power head in the power groove when the power head is rotated. At least one portion of the flange is movable to disengage the adjacent component. The flange is connectable to a powered accessory for powering by the power groove.

Optionally, the first contact and the second contact are substantially L-shaped. The flange may have a first flange body and a second flange body. One of the first and second flange body may be movable relative to the other. The outer flange body may be biased to engage a track housing, a hardware assembly, awning roller tube or a cassette awning assembly. The accessory base may further comprise tabs extending from the outer flange body for engagement of the component. The accessory may be a light, a fan, or comprise at least one of audio or video. At least one track may be disposed within an awning assembly or a track housing. The power groove may comprise at least one track including a first and a second conductor.

According to some embodiments, an accessory base for use with powered accessory, comprises a flange having a first side and a second side, a grip to aid rotation of the flange, a power head extending from the flange, a first contact extending from the power head and a second contact extending from the power head, the power head having a first dimension which is less than a second dimension, the first dimension allowing passage through a power groove, a conduit housing disposed at one of the first side and the second side of the flange.

Optionally, the conduit housing may have an elbow shape. The second side and the first side may be at non-parallel angles or may be parallel. The accessory base may further comprise a cavity in said body. The accessory base may further comprise conductors disposed within the cavity and extending from the first and second contacts through the conduit housing. The accessory base the accessory base may be mountable in an awning roller tube, a hardware assembly, a cassette awning assembly and a track housing. The flange may have an outer flange body and an inner flange body. One of the outer and inner flange bodies may move relative to the other of the outer and inner flange bodies.

According to still other embodiments, a power track assembly for powering an accessory may comprise a track housing having at least one opening defining a power groove, the track housing being capable of mounting on a surface, at least one power track is located in the track housing, a first conductor and a second conductor is disposed in the at least one power track, and, at least one accessory base is disposed in the at least one opening in electrical communication with said first and second conductors to power an accessory connected to the at least one accessory base.

Optionally, the power track assembly may further comprise a first power-in feed cover connected to the track housing. The power-in feed cover at one end of the track housing may be in electrical communication with the first and second conductors in the power track. The power track assembly may further comprising at least one track end cap. The track housing may be extruded. The track housing may have a plurality of retaining ribs to locate the at least one power track. The power track assembly, the at least one opening receiving the accessory base in a first orientation and retaining said accessory base in a second orientation. The power track assembly may further comprise the accessory base having a first accessory base contact and a second accessory base contact. The accessory base may be connected to the at least one track at a first side of the accessory base and the accessory base being connected to the second side of the accessory base. The track housing may be one of linear, curved or a combination. The accessory base may have a tab which extends into the opening defining the power groove.

According to some embodiments, a power track awning assembly comprises a power groove on at least one of a track housing, an awning roller tube, cassette awning assembly or a hardware assembly, at least one power track with first and second conductors extending through the power track. An accessory base comprises a power head and a first contact and a second contact each extending from the power head, the power head capable of at least one orientation to fit within the power groove. The power head extends from a flange, the flange being connectable to a powered accessory. The first contact and the second contact are in electrical communication with the first and second conductors. The first and second contacts have an opposite end which is electrically connectable to the powered accessory.

Optionally, the first and second contacts may be substantially L-shaped. The power track awning assembly may further comprise a wire conductor extending from the first and second contacts and connectable to the powered accessory. The power head may have a first dimension which is less than a width of the power groove and a second dimension which is greater than a width of the power groove. The power head may be rotatable within the power groove to engage the first and second contacts with the first and second conductors. The at least one track may be first and second tracks. The flange may having an outer grip. The outer grip may aid rotation of the accessory base relative to the power groove. The outer grip may also define a shoulder to move the outer grip surface along the flange to disengage tabs from the track housing.

A power track assembly for powering an accessory comprises a track housing having at least one opening to receive at least one accessory base, the track housing capable of being mounted on a wall or a ceiling, at least one track disposed within the track housing, the track having first and second conductors, the at least one accessory base disposed in the track housing, the accessory base having contacts in electrical communication with the conductors of said at least one track.

All of the above outlined features are to be understood as exemplary only and many more features and objectives of a power track awning assembly may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the power track awning assembly will now be described by way of examples. These embodiments are not to limit the scope of the claims as other embodiments of the power track awning assembly will become apparent to one having ordinary skill in the art upon reading the instant description. Non-limiting examples of the present embodiments are shown in figures wherein:

FIG. 5A is a detailed section view of the power track awning roller tube assembly;

FIG. 9 is a side view of an alternate cassette awning assembly;

FIG. 9A is a side detail view of an extrusion utilized with the cassette awning of FIG. 9;

FIG. 22 is a first side view of the accessory base;

FIG. 23 is a second side view of the accessory base;

DETAILED DESCRIPTION

Figure 1:
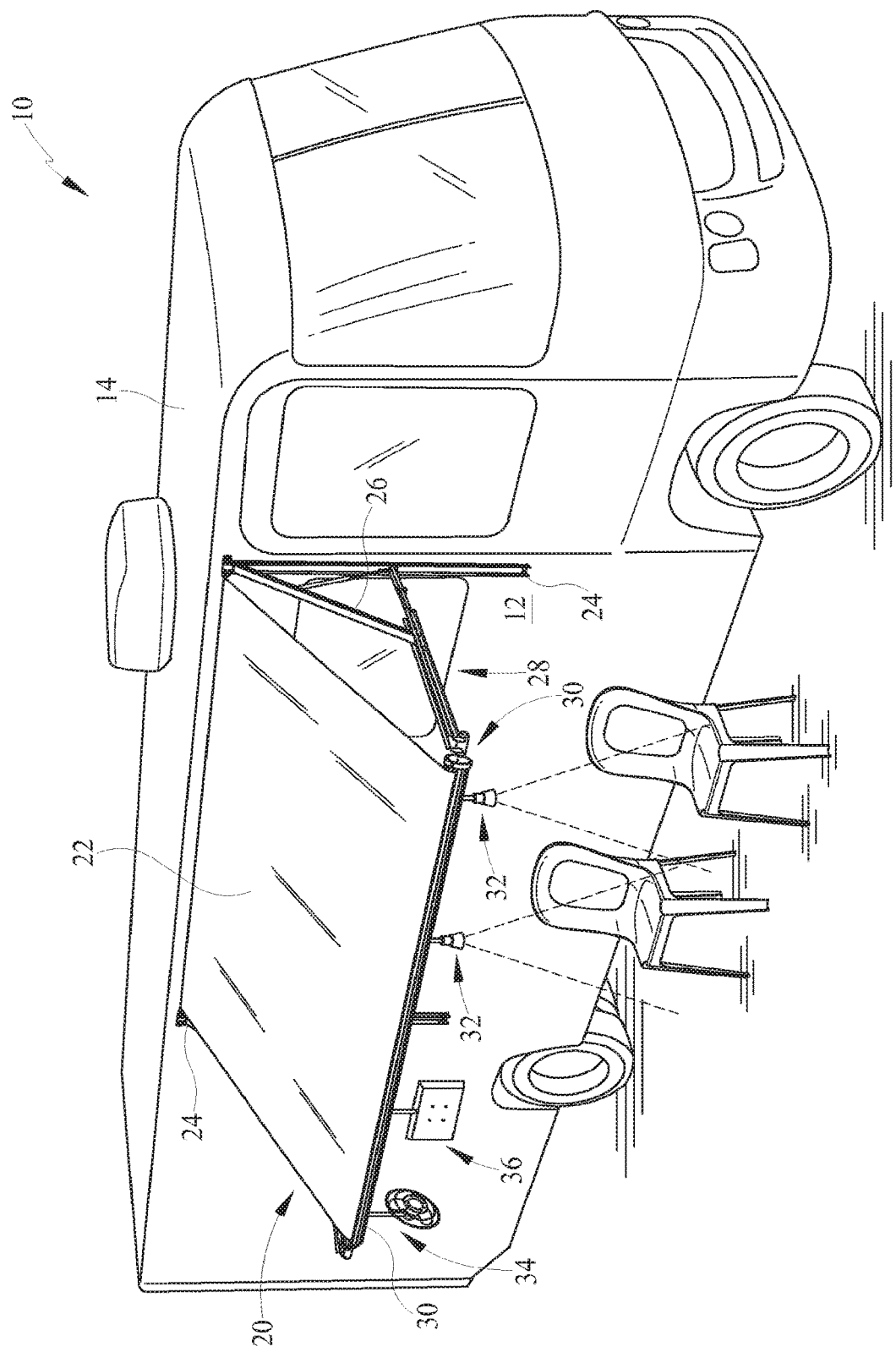
FIG. 1 is an isometric view of an exemplary recreational vehicle having a power track awning assembly having various accessories located therein.

It is to be understood that the power track awning assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-26 various embodiments of the power track awning assemblies. The assemblies may include an awning roller tube having a power groove extending axially between a first end and a second end of the tube, either in full or in part. The power groove includes at least one track having first and second conductors which are in electrical communication with an accessory mount or base. The accessory base provides electricity to each of various electrically powered accessories which may be utilized with the power track awning assembly. The power track awning assembly allows for rotation of the awning tube despite the tube being rotatable between fixed ends of the assembly. Alternatively, the power track awning assembly may include an awning bar wherein an extrusion has a power groove including at least one track and conductors for electrical communication with an accessory base powering an accessory, for example for use in a cassette-type awning. In still further embodiments, a hardware assembly is provided with a power groove for powering accessories from the awning assembly hardware.

Referring now to FIG. 1, a perspective view of a recreational vehicle (RV) 10 is depicted. The exemplary RV includes a drive and a transmission, not shown, as well as at least one sidewall 12 and a roof 14. It should be understood that although an RV is referred to in the exemplary embodiments, one skilled in the art should understand that the use of the awning with a power track is not limited to these drivable vehicles. The term "RV" is also meant to include towable structures, sometimes called campers, homes and other stationary structures as well as boats or other marine applications for example which use canopy structures which may or may not be retractable, commercial vehicles, agricultural vehicles, horse trailers, and temporary structures such as those used at sports events, (tailgating), flea markets. All of these structures are considered to be usable with the power track awning assemblies of the present embodiments.

An awning assembly 20 is connected to the sidewall 12 and/or the roof 14 of the vehicle 10. In further embodiments, the awning assembly 20 may be retractable within the sidewall 12 so as to reduce the airflow interference of the assembly while the vehicle 10 is being operated.

The awning assembly 20 includes an awning or canopy 22 and hardware assembly 28 defined by at least one first arm 24 and at least one second arm 26. The awning hardware assembly 28 is utilized, according to the instant embodiment, to connect the awning assembly 20 to the sidewall 12 of the vehicle 10. The hardware assembly 28 allows for support of the canopy 22 in an extended position (shown) or in a retracted position. The hardware assembly 28 also provides a pathway for wiring from a power source to the awning roller tube to power an accessory or power the awning motor. The awning assembly 20 is exemplary and other variations may be utilized. Also, the roller tube assembly may be movable as shown, or may be fixed to the sidewall 12. Further, for example, according to some embodiments, a cassette style awning may be utilized.

The depicted awning assembly 20 further includes a power track awning assembly 30 which moves inwardly and outwardly with corresponding retraction or extension of the canopy 22 to provide the sheltered or shaded area beneath the awning assembly 20. The awning assembly 20 may be a manually operated assembly requiring manual rotation to extend or retract the canopy 22. Alternatively, the awning assembly 20 may be an automated system such as by electrical, air, hydraulic or other fluid power systems to cause extension or retraction of the canopy 22.

The power track awning assembly 30 is shown in extended position with various accessories 32 located therein. For example, the power track awning assembly 30 depicts a pair of pendant track lights 32 depending from the awning roller tube which provide illumination for the area beneath the awning assembly 20. While pendants are shown, other types of lights may be utilized and this description should not be considered limiting. Additionally, a fan accessory 34 is shown spaced from the pendant lights 32. The fan accessory 34 creates an air flow beneath the awning assembly 20 which aids to provide a cool feeling in the area and move air so as to reduce the amount of insects in the area beneath the awning. These accessories 32, 34 are merely examples and not limiting as various other accessories may be utilized such as audio-video equipment for example, wireless speakers, television 36, or the like, all of which may be powered by the power track awning assembly 30 and all of which are collectively referred to as accessories.

Figure 2:
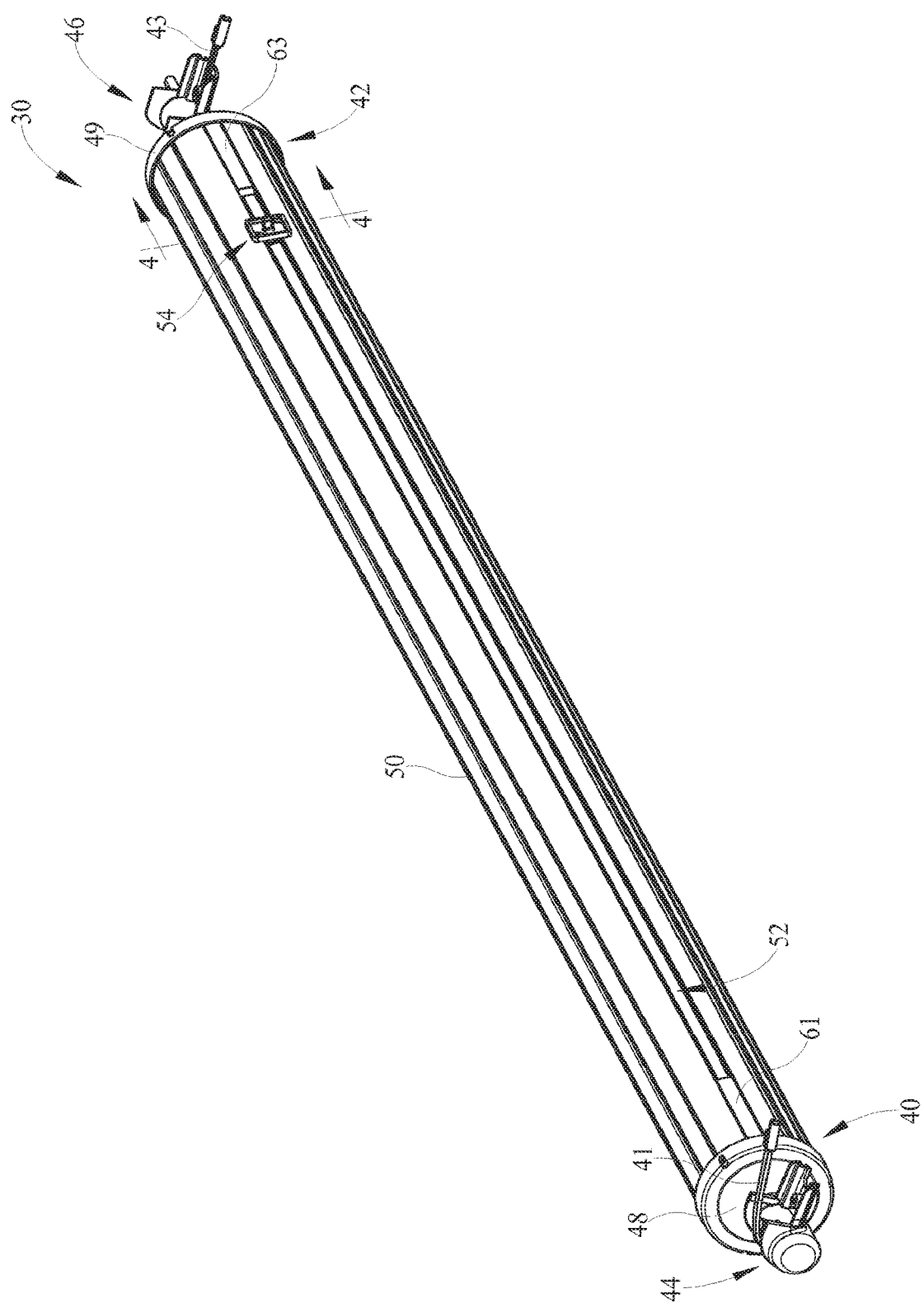
FIG. 2 is an isometric view of an assembled power track awning assembly.

Referring now to FIG. 2, the power track awning assembly 30 is shown in isometric view removed from the awning canopy 22 (FIG. 1) and hardware assembly 28. The power track awning assembly 30 includes an awning roller tube 50 having a first end 40 and a second end 42. Rotation of the roller tube 50 is provided between fixed top castings 44, 46 and bushing structures which allow for rotation of end caps 48, 49 and the roller tube 50. A rotatable conductor 60 (FIG. 3) is provided at one of the first and second ends 40, 42 of the power track awning assembly 30 to provide electrical power for a power groove 52. The power groove 52 extends between the first end 40 and the second end 42 of the power track awning assembly 30 and may extend continuously through the entire roller tube 50 or may extend partially between the first end 40 and the second end 42. Additionally, a single power groove 52 is depicted however, multiple grooves may be utilized in alternate embodiments. For example, multiple grooves may be used which are axially aligned. Also, multiple grooves may be used which are spaced apart circumferentially about the awning roller tube.

An accessory base 54 is depicted in the groove 52 and makes powered connection for various accessories. The accessories may be connected to the base 54, to provide power from the groove 52 to any of the accessories for example, 32, 34, 36 (FIG. 1).

At the first end 40 of the power track awning assembly 30 is a power wire 41 with a connector. The wire 41 in the exemplary embodiment provides power to a motor which causes rotation of the roller tube 50 and end caps 48, 49. At the opposite end, a second wire 43 is depicted extending from the second top casting 46 and provides power for the power groove 52 and accessories connected to the accessory base 54. The wires 41, 43 are connected to additional wiring which runs through the hardware 28 and therefore, remains substantially hidden from view and from possibility of entangling with other structures or during the use of the awning assembly 20 (FIG. 1). For example, with brief reference to FIG. 10, an exemplary routing is shown wherein the wiring is shown passing through the hardware assembly. The wiring is depicted as a broken line and raised from the hardware assembly 28, but in actual use is positioned within the hardware assembly 28. Specifically, in the depicted arrangement, the hardware 28 includes a first arm 24 which mounts to a sidewall 12 of an RV 10 or fixed structure. A second arm 26 is pivotally connected to the first arm 24 and a third arm 27 is pivotally connected to the second arm 26. The hardware assembly 28 may further comprise a strut 29 or alternatively may comprise an adjustable arm assembly 31 which allows height adjustment of the ends of roller tube 50 and awning 22. The wiring extends through the third arm 27, through the second arm 26 and to the first arm 24 where it may extend upwardly or downwardly. The arms 24, 26 and 27 of the hardware assembly 28 may be closed cross-section structures or may be open or a combination thereof.

Figure 3:
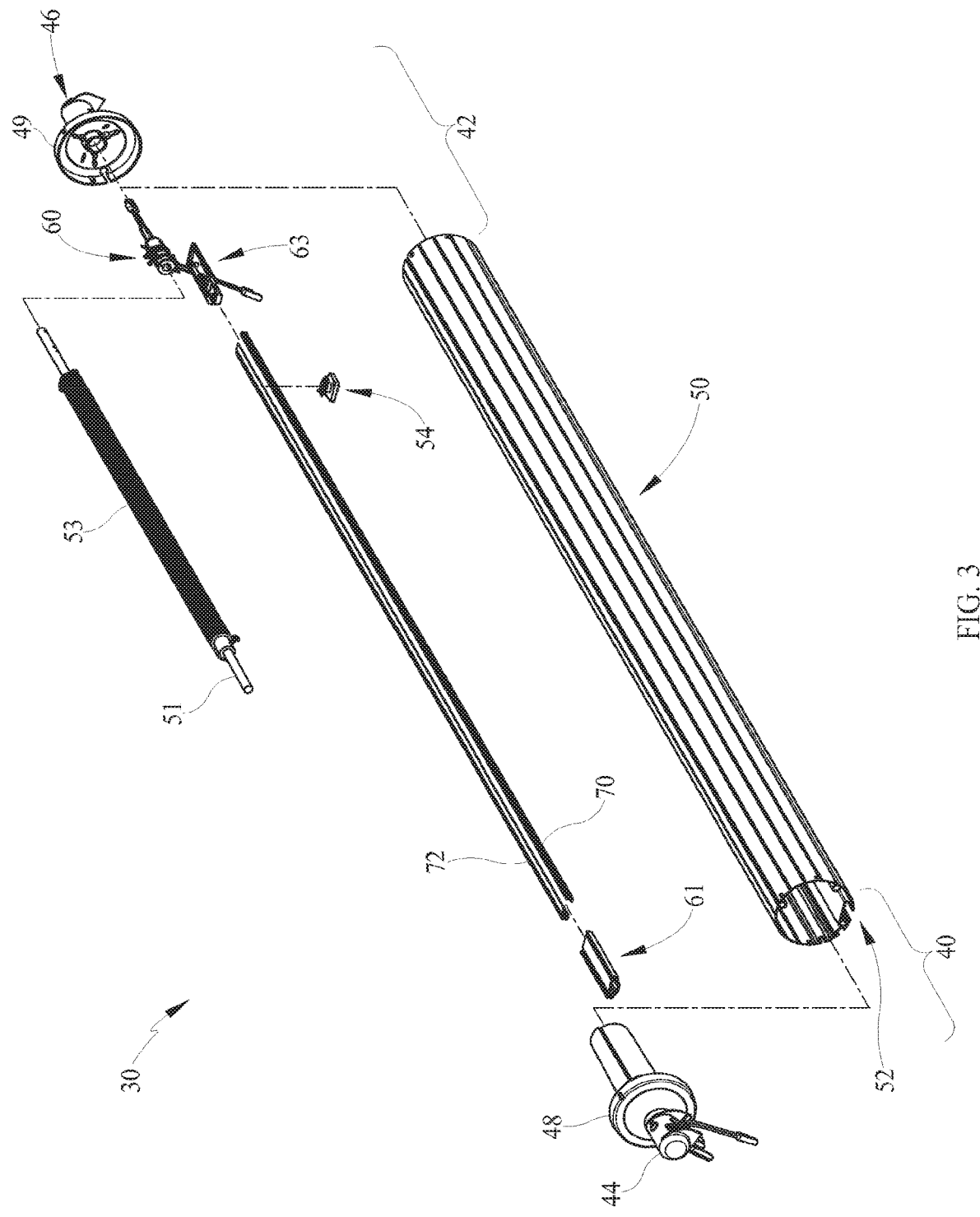
FIG. 3 is an exploded isometric view of the power track awning assembly.

Referring now to FIG. 3, an exploded isometric view of the power track awning assembly 30 is depicted. The awning tube 50 has a rod 51 with a torsion spring 53 wrapped thereabout which extends coaxially through the tube 50. This torsion spring 53 serves to assist the motor in closing the canopy 22, and helps to control awning extension. The rod 51 is connected to a rotating conductor 60 which extends through the end cap 49. The rotating conductor 60 allows for transmission of electrical voltage and current from the fixed part of the assembly 30, which is the top casting 46, into the rotating portion of the assembly 30, including the roller tube 50 and to the tracks 70, 72. This precludes wrapping or binding of electrical wires. The end cap 49 is connected at a second end 42 of the power track awning assembly 30. The first end 40 of the assembly includes the end cap 48 and top casting 44 which are connected to a motor assembly that extends into the tube 50.

In this view, the tube 50 is shown with the power groove 52 extending axially through the tube 50 from the first end 40 toward the second end 42. As previously described, the groove 52 may extend completely through the tube 50 in the axial direction or may extend partially. Further, while one groove 52 is shown, multiple grooves 52 may be utilized in extending from a first end 40 toward a second end 42. Additionally or alternatively, multiple grooves 52 may be spaced circumferentially about the tube 50.

Exploded from the power groove 52 are first and second tracks 70, 72. The tracks provide conductors 84, 85 (FIG. 5A) which are engaged by the accessory base 54 to provide power to an accessory attached to the roller tube 50. Two tracks 70, 72 are shown but the tracks may be formed as a single structure and located within groove 52.

According to the instant embodiment, the power groove 52 extends completely through the roller tube 50. The groove 52 is covered at ends by the covers 61, 63. One of covers 61, 63 may be cosmetic in function serving to create a symmetrical appearance with the opposite cover 61, 63. The other of covers 61, 63 may be a power-in feed cover which transfers power from the rotating conductor 60, and functions as a plug to power the track conductors 84, 85 within the tracks 70, 72. Additionally, the exemplary rotating conductor 60 is further shown and described in co-pending U.S. non-provisional patent application Ser. No. 14/278,036, titled "Rotatable Awning with Illumination", filed May 15, 2014 by Taylor, all of which is incorporated herewith.

Figure 4:
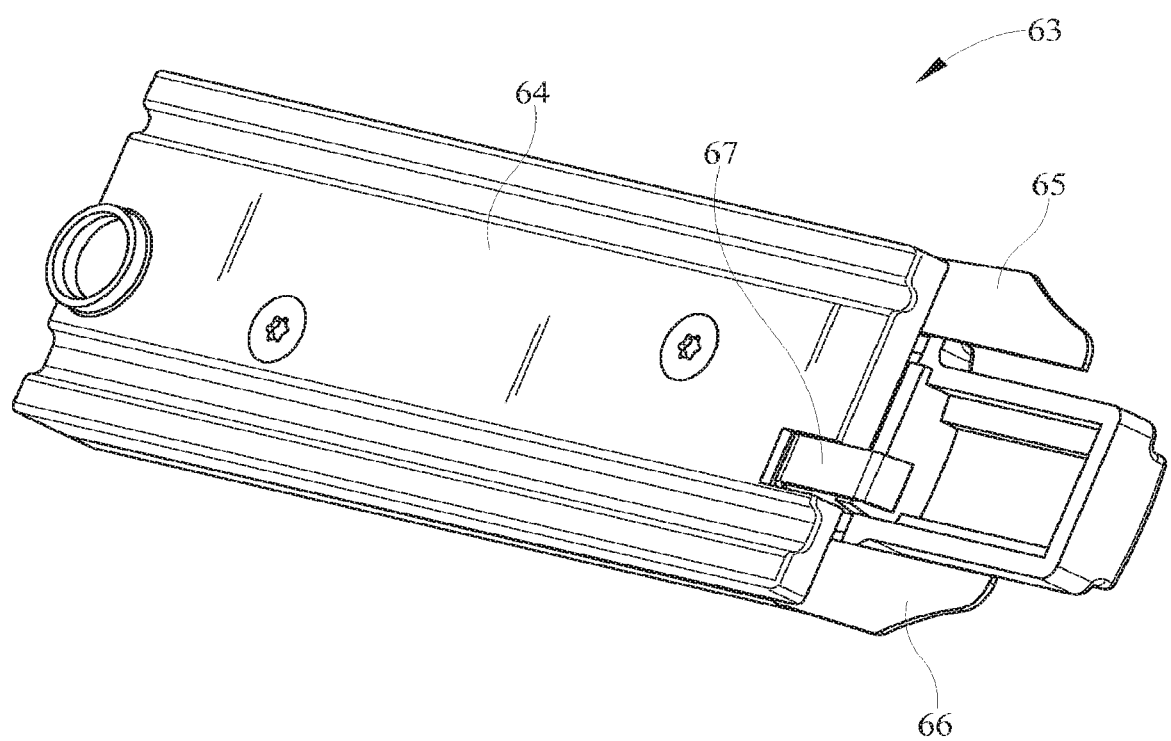
FIG. 4 is an isometric view of a power-in feed cover shown in FIG. 3.

With reference now to FIG. 4, an isometric view of a power-in feed cover 63 is shown. For purpose of orientation, the depicted side of the cover 63 faces the interior of the roller tube 50 (FIG. 3) and groove 52 (FIG. 3) and is positioned within the groove 52 of the awning roller tube 50. The cover 63 is positioned at an end of the groove 52 adjacent to roller cap 49, for example, on one side and the tracks 70, 72 (FIG. 3) on the other side, in an axial direction. The cover 63 includes a housing 64 which may be formed of various materials which are molded, cast or otherwise formed of non-conductive materials. Extending from the housing 64 is first and second cover conductors 65, 66. The conductors 65, 66 define portions of a circuit which provides electrical communication between the rotating conductor 60 and the tracks 70, 72 having conductors 84, 85 (FIG. 5A) therein. Thus, the cover 63 functions to provide a power-in feed to the tracks 70, 72. Also, located on the housing 64 is a third cover conductor 67 (see also FIG. 5A) which provides a sensor for detecting the presence of accessories. The conductor 67 comes in contact with third conductor strip 89 (FIG. 5A). When conductor 67 comes in contact with strip 89 it completes a circuit to ground. This grounding action communicates to an awning controller or other circuit for purpose of decision making chart 200 (FIG. 11) that an accessory 32 is installed in the power groove 52. If an accessory in not present, then the ground circuit is open and the awning is allowed to roll up. If the ground circuit is closed, the awning is not allowed to roll up. Thus, the system functions as a safety device. The conductors 65, 66, 67 may be formed of various materials including, but not limited to, copper, brass or other electrically conductive material types.

Figure 5:
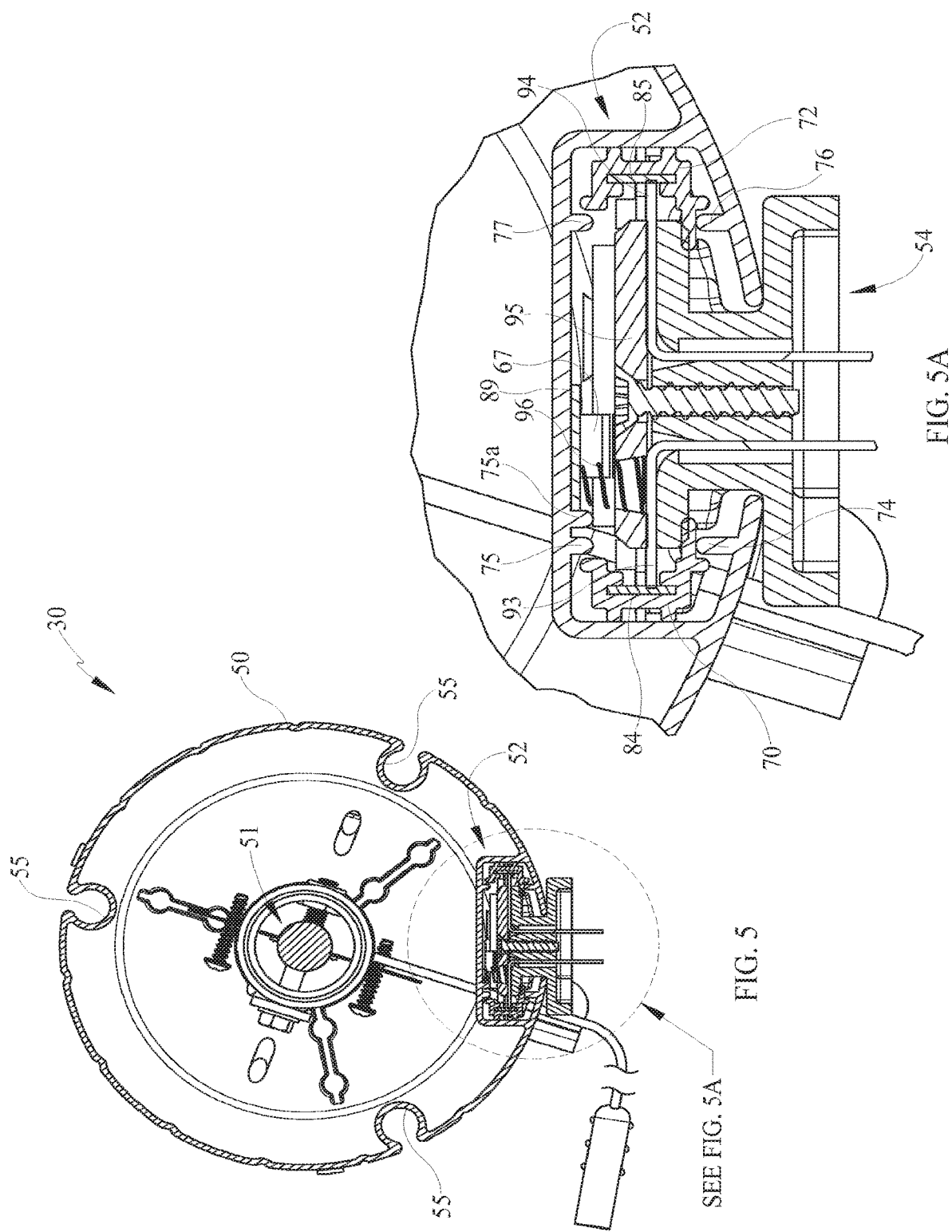
FIG. 5 is a section view of the power track awning roller assembly.

Referring now to FIG. 5, a section view of the power track awning assembly 30 is depicted. In this view, the roller tube 50 is shown. Additionally, a plurality of axial grooves 55 are shown in the tube 50 for connection of the canopy 22 (FIG.

1) to the roller tube 50. The tube 50 includes the power groove 52 formed integrally with the tube 50. The tube 50 may be extruded of various materials including, but not limited to, aluminum which has lightweight but high strength characteristics.

With additional reference to FIG. 5A, within the power groove 52 are the first and second tracks 70, 72. The tracks 70, 72 are retained in position by a plurality of locating ribs 74, 76. The ribs 74, 76 locate the tracks in desired positions within the groove 52 and inhibit undesirable movement. Specifically, the first track 70 is retained by at least one first locating rib 74. In the exemplary embodiment, there are two ribs 74, 75 which locate the first track 70 in a desired position within the groove 52. Similarly, with regard to the second track 72, at least one retaining rib 76 is utilized to locate the track 72. In the exemplary embodiment, the track 72 is positioned with two retaining ribs 76, 77.

With reference still to the detailed section view of FIG. 5A, of the roller tube assembly 30, accessory base 54 is disposed within the groove 52. The accessory base 54 includes a power head 95 which extends into the groove 52. The power head 95 includes a pair of contacts 93, 94 which also engage conductors 84, 85 in the tracks 70, 72 to complete a circuit and any of the exemplary power accessories 32, 34, 36 which are mounted to the accessory base 54.

Also shown in this view is a conductor or electrical strip 89. As with the tracks, 70, 72, the electrical strip 89 is located with a rib 75a, adjacent to rib 75. The electrical strip 89 is engaged by a third contact 96 extending from power head 95, as well as third cover conductor 67 and provides a safety feature. According to some embodiments, the third contact 96 may be a spring contact while according to other embodiments, the contact 96 may be a solid contact. Since the canopy 22 (FIG. 1) wraps about the roller tube 50 when the awning assembly 20 is stowed, the accessory base 54, including any accessory, should be removed from the power groove 52 before the canopy 22 is wrapped. The electrical strip 89 and third contact 96 inhibit operation of the awning motor when the accessory base 54 is disposed in the groove 52. As a result, the awning assembly 20 cannot be stowed when an accessory is located in the power groove 52, inhibiting damage to the awning assembly 20 or the accessory.

Figure 6:
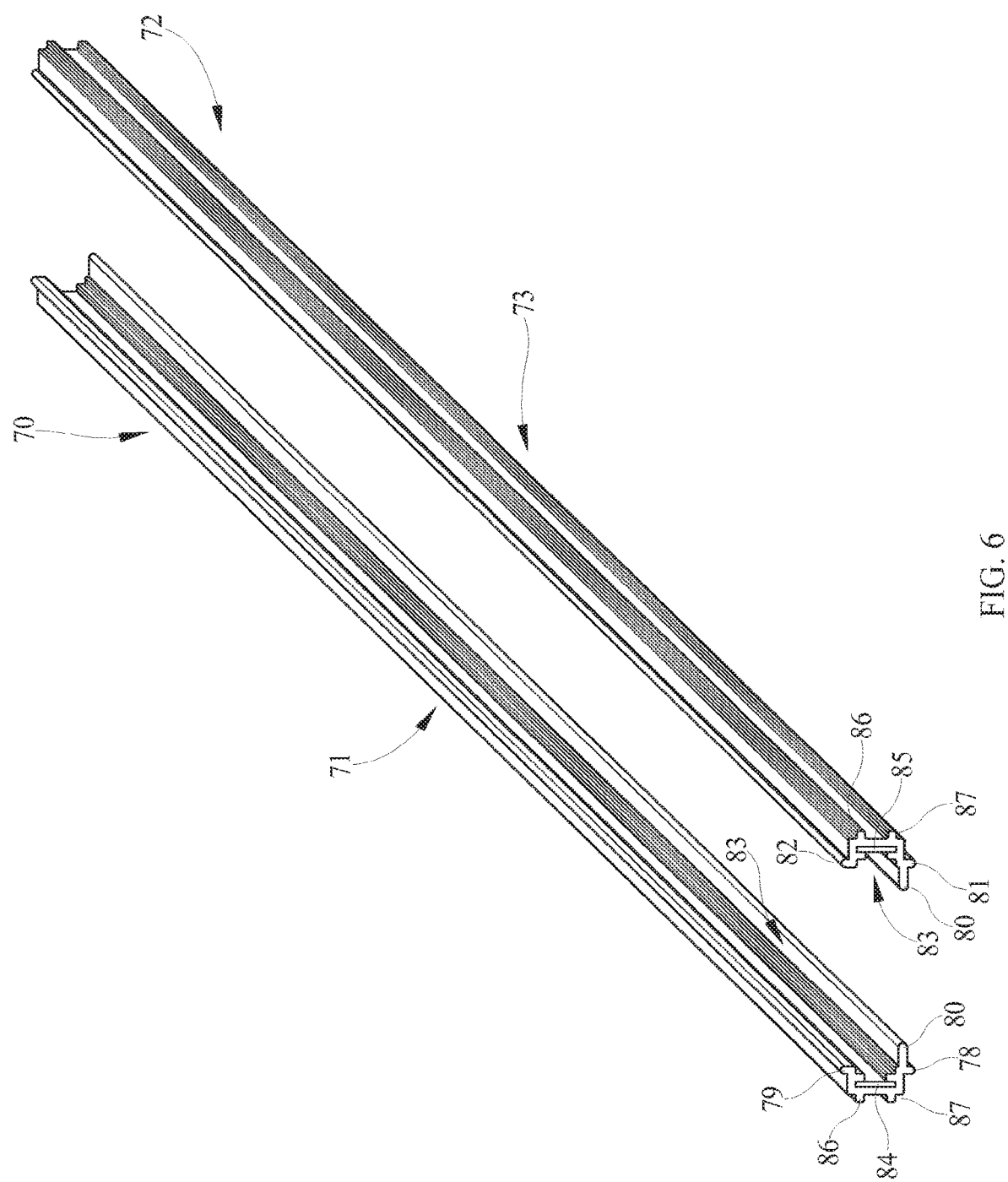
FIG. 6 is an isometric view of the first and second tracks of the assembly of FIG. 2.

Referring now to FIG. 6, the first and second tracks 70, 72 are depicted removed from the power groove 52. Each track 70, 72 has an extrusion body 71, 73 which is generally U-shaped. Extending from near one end of the U-shaped extrusion bodies 71, 73 are ribs 78, 79 and 81, 82. The extrusion bodies 71, 73 further comprise arms 80 which, when viewed in FIG. 5A, limit vertical movement by engaging the ribs 74, 76. Each of the extrusion bodies 71, 73 further defines a cavity 83 wherein conductors 84, 85 are located. The conductors 84, 85 provide power to the accessory base 54 (FIG. 5A) when the base is moved to a preselected position. The extrusion bodies 71, 73 further comprise a plurality of laterally extending ribs 86, 87 which space the tracks 70, 72 from the walls of the power groove 52.

One skilled in the art should be aware that while two tracks 70, 72 are shown, the instant embodiment should not be limited. For example, a single track structure may be formed which houses and separates both conductors 84, 85 and therefore such embodiment is also considered within the scope of the instant disclosure. Further the at least one track, or two tracks 70, 72, may be formed in a plurality of manners. In one embodiment, the extrusion bodies 71, 73 may be coextruded with a metal defining the conductors 84, 85. The conductors 84, 85 may be formed of copper, brass or other conductors according to the non-limiting description. The extrusion bodies 71, 73 are generally non-conductive so as to insulate the conductors 84, 85 from touching other components of the groove 52 or any part of the roller tube 50. For example, the extrusion bodies 71, 73 may be formed of polymerics or plastimerics including but not limited to vinyl, polyethylene, HDPE, LDPE and like materials. It is desirable that these materials be non-conductive. According to a second embodiment, the conductors 84, 85 may be pre-formed and added to the extrusion bodies 71, 73 when the bodies are formed, such as by extrusion, molding, casting or other forming process. According to a third embodiment, the conductors 84, 85 may be joined in manual or automated fashion after the extrusion bodies 71, 73 are formed independently.

As with the description of the power groove 52, the tracks 70, 72 may be formed of various lengths. The length may depend upon the length of the groove 52 and may extend for the entire length of the roller tube 50 or may extend some length less than the length of the roller tube 50. Additionally, more than one groove 52 may be formed in the tube 50 and therefore, more than one pair of tracks 70, 72 may be formed to be positioned in the tube 50.

Figure 7:
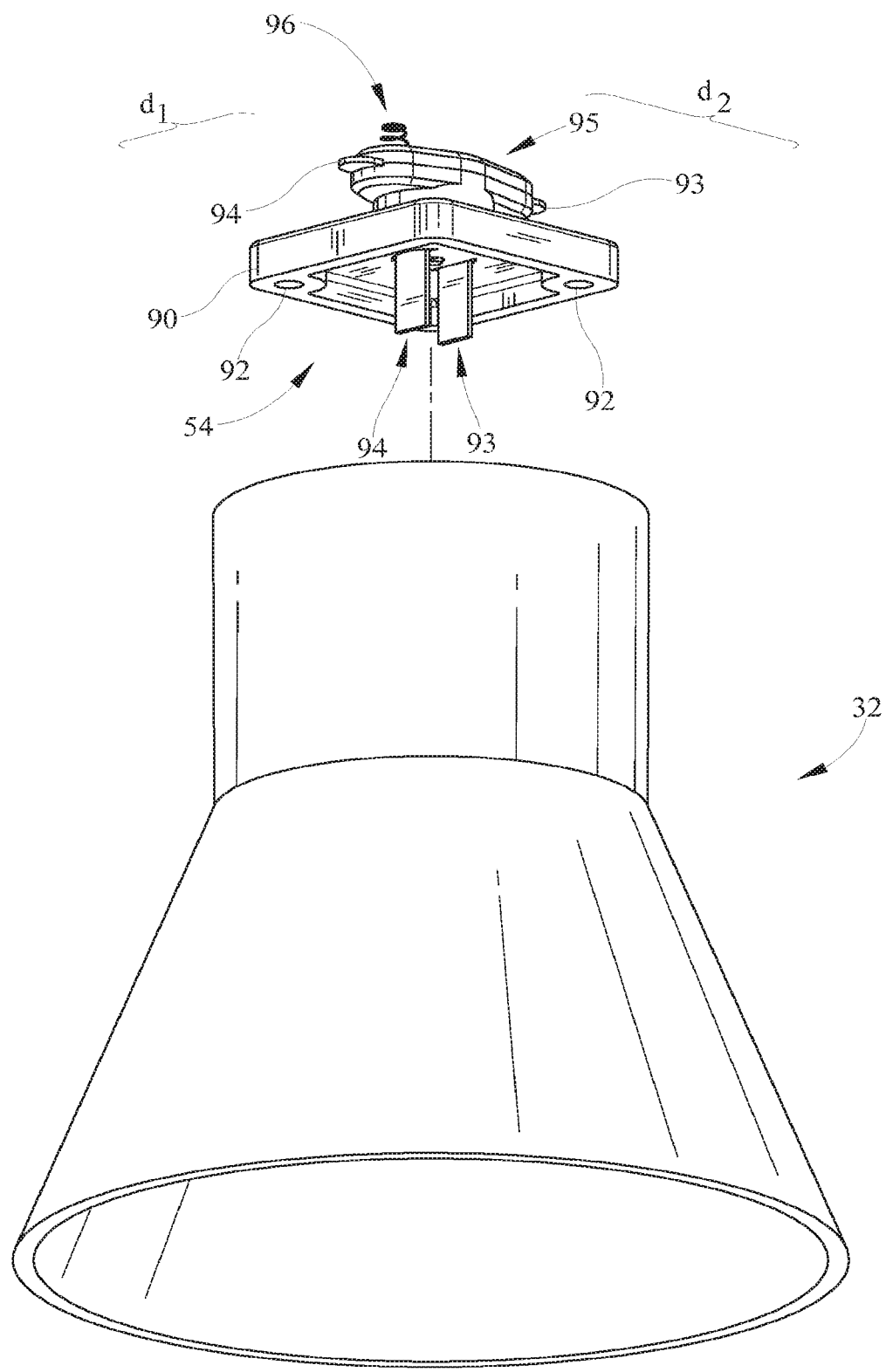
FIG. 7 is an isometric view of the assembled accessory base including the power head.

Referring now to FIG. 7 an isometric view of an accessory base 54 is depicted. The base 54 comprises a flange 90 including at least one aperture 92 for connection of the accessory base 54 to an accessory, such as the accessories 32, 34, 36 previously depicted in FIG. 1. The base 54 may be formed to be interchangeable with various accessories. The flange 90 is shown as a square shape with two apertures 92. However, the flange 90 may be formed of various shapes corresponding to the shapes utilized for the corresponding shapes of the accessories and therefore, this depicted embodiment is not limiting. Extending through a lower surface of the flange 90 are first and second contacts 93, 94 which extend into a power head 95 and turn so as to extend outwardly from the power head 95. The power head 95 has a first dimension $d_1$ and a second dimension $d_2$. The first dimension $d_1$ is less than an opening dimension in the power groove 52 so that the head may be inserted into the groove 52. The second dimension $d_2$ extends between the first and second contacts 93, 94 and is greater than $d_1$. The second dimension $d_2$ is greater than the opening dimension of the power groove 52 so that when rotated, the power head 95 and accessory base 54 are locked into position within the power groove 52. Further, when the rotation of the power head 95 and accessory base 54 occurs, the first and second contacts 93, 94 engage the conductors 84, 85 of the tracks 70, 72. Thus, with reference again to FIGS. 5-7, one skilled in the art will understand that the various ribs 74, 75, 75a, 76, 77 of the power groove 52 and the extrusions 71, 73 provide a locating functionality for the tracks 70, 72 and more importantly, the conductors 84, 85 so that the contacts 93, 94 may be reliably installed into the power grooves 52 and engage the conductors 84, 85. Extending from the power head 95 is a third contact 96. The third contact 96 engages an electrical strip 89 (FIG. 5A) extending through the power groove 52. When the contact 96 engages the electrical strip 89, a circuit is defined such that the motor of the awning assembly 20 cannot rotate the awning roller tube 50. Thus, any accessory that is installed, for example accessory 32, should not be damaged due to inadvertent starting of the awning roller 50. However, when the accessory base 54, and necessarily accessory connected to the base 54, is removed and the third contact 96 disengages the electrical strip 89

(FIG. 5A), the awning assembly 20 may be rotated from the extended position shown in FIG. 1 to a closed and stowed position without risk of damaging any accessories.

Figure 8:
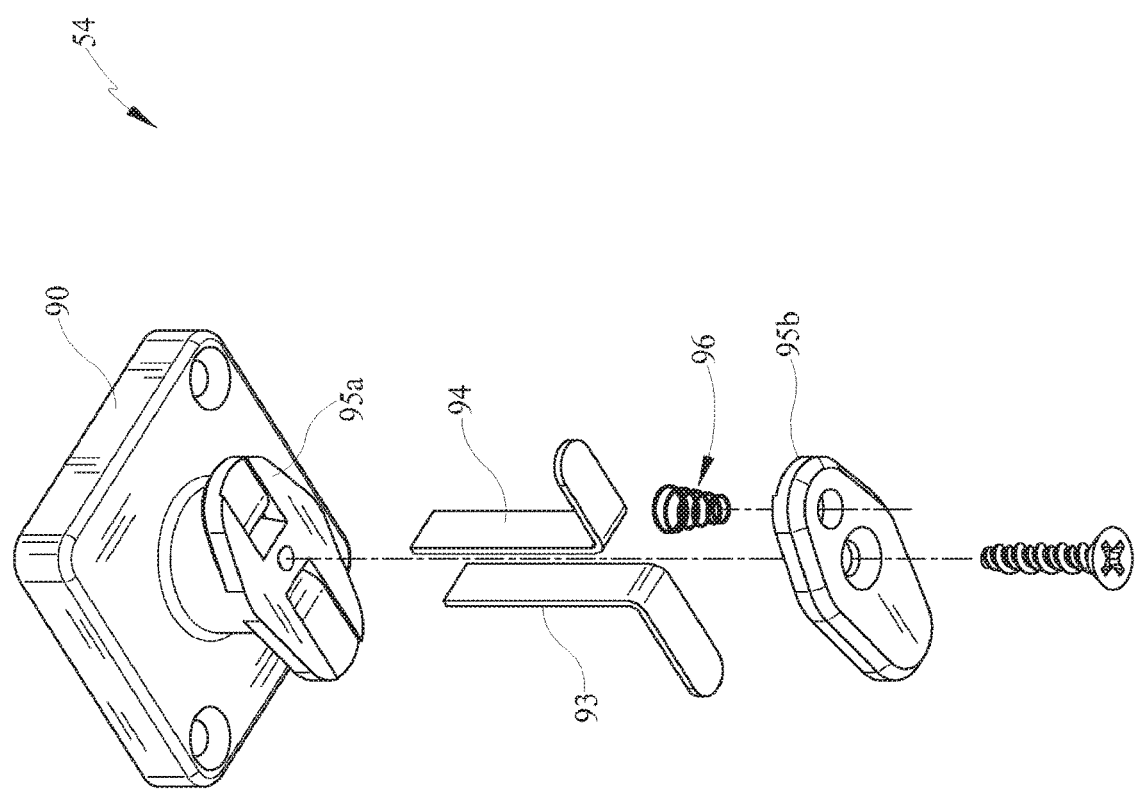
FIG. 8 is an exploded isometric view of the embodiment of FIG. 7.

Referring now to FIG. 8, an exploded isometric view of the accessory base 54 is depicted. The flange 90 is exploded from the first and second contacts 93, 94. It should be clear to one skilled in the art that the contacts 93, 94 extend through the flange structure 90 and depend outwardly so as to pass from the flange 90 and out from the power head 95. The power head 95 is also shown to be formed of two pieces 95a, 9b which are fastened together and allow for ease of assembly of the right angle contacts 93, 94. Additionally, the third contact 96 is shown which extends from a hole in the power head cover 9b so that the spring contact 96 may engage the electrical strip 89 (FIG. 5A) within the power groove 52 (FIG. 5A) and complete the safety portion of the circuit previously described.

Referring now to FIG. 9, a side isometric view of an alternate cassette awning assembly 120 is depicted. One skilled in the art will understand that cassette awnings differ from that of the previous embodiments wherein the roller about which a canopy 122 wraps is located at a fixed end of the roller assembly 130, for example against a wall of a stationary structure such as a house or commercial building or alternatively, a side wall of the RV 10 (FIG. 1). The roller assembly 130 is generally fixed in the instant embodiment and at an opposite end is defined by an extending bar 131 which moves toward or away from the fixed rotating awning assembly 130. Between the bar 131 and the roller assembly 130, is a hardware assembly 128 which comprises pairs of first and second foldable arms 124, 126. These arms 124, 126, defining the hardware assembly 128, provide support for the awning or canopy 122 extending from the roller assembly 130 to the bar 131. This is a general description of a cassette awning and other constructions may differ, and therefore this should be considered a non-limiting description of merely one embodiment which may be utilized in combination with an extrusion 151.

With further reference now to the detail view of FIG. 9A, the extrusion body 151 is formed of an arm which may be tapered or angled relative to the bar 131 or may depend vertically, downwardly from the bar 131. According to other embodiments, the extrusion 151 may be formed to extend outwardly and generally parallel or at a slight descending angle relative to the ground. The extrusion 151 may have a plurality of retaining channels 157 for either retaining portions of the awning 122 or other accessory products which may be desirably used with the cassette awning 120. Toward a lower end of the extrusion 151 is a power groove 152 which comprises an opening as in the previous embodiment for retaining at least one track having at least first and second conductors 184, 185. According to instant embodiments, two tracks 170, 172 are shown wherein the power groove 152 further comprises ribs 174, 175 and 176, 177 to retain the tracks 170, 172 in position and properly locate the tracks 170, 172 therein.

The tracks 170, 172 comprise bodies as previously described with ribs which also aid to locate the tracks 170, 172 within the power groove 152. The tracks 170, 172 further comprise conductors 184, 185 which are engaged by an accessory base as with the previous embodiment. Thus, the extrusion 151 provides a system for providing power through the awning assembly 120 and to the power groove 152 such that powered accessories may be utilized when the awning 120 is in an extended position.

As with the previous embodiment, it would be desirable to route wiring which extends between the extrusion 151 and the RV 10 (FIG. 1) or fixed structure through the hardware assembly 128. Accordingly, wiring may run through the arms 124, 126 to the bar 131 wherein the wiring may be routed from the bar 131 to the power groove 152 and through a power head (not shown) to an accessory.

Figure 11:
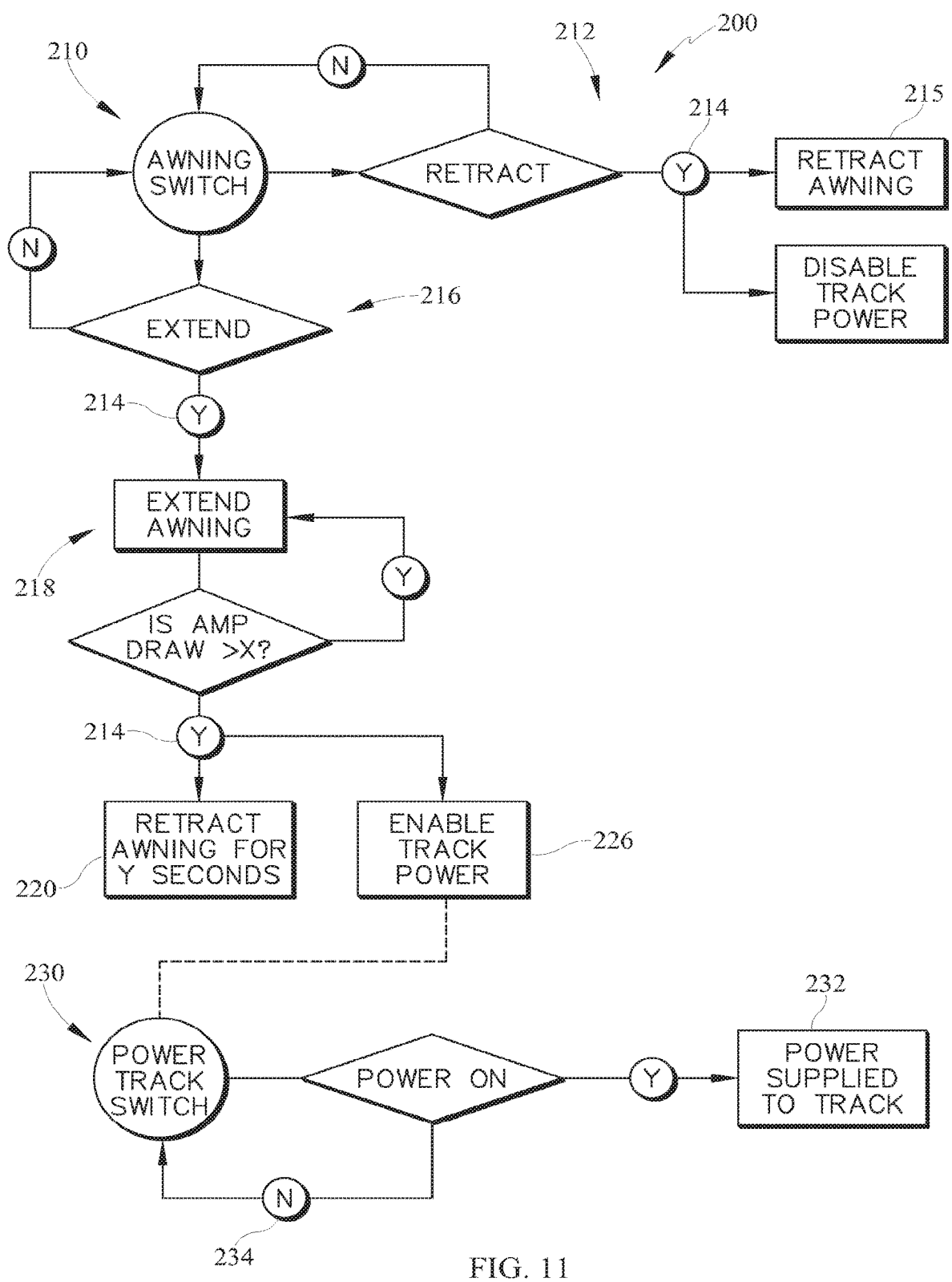
FIG. 11 is an exemplary control logic flow chart for use of the power track awning.

Referring now to FIG. 11, a control logic flow chart 200 for use of the power track awning is depicted. The use of the awning by itself is controlled in part by an awning switch 210 which is in electrical communication with a controller, circuit or other arrangement which allows for input and output based on preselected criteria to determine whether or not to supply power to the power track for powering an accessory 32. The awning switch 210, according to one embodiment, may be a three position switch, for example with a neutral center position and first and second temporary positions meaning the switch must be held to either extend or retract the awning. The awning may also be retracted with the switch 210. When the switch 210 is disposed in a manner to retract 212 the awning, the awning motor 214 is powered to retract the awning at 215. When the awning is retracted, the power groove 52 is disabled. That is, the tracks 70, 72 are not powered.

Alternatively, if the awning switch 210 is moved to a position so as to extend the awning, the awning motor 214 rotates and causes the awning to extend 216. As the awning extends, the system 200 is continually determining whether the awning is fully retracted. A determination is made as to whether the motor amperage exceeds a preselected level. When the amperage exceeds the preselected amount, this represents a condition wherein the awning is fully extended causing the motor 214 amperage to rise above a desirable range. If the answer is no, the motor 214 continues to extend the awning. If the amperage exceeds the preselected amount 218, the motor 214 backs the roller up some amount or reverses from some preselected time period at 220. At this time, power is supplied to the track of the groove 52 at 226.

Once the awning is extended, the power track may be enabled for operation. This means that power is provided to the power groove 52 and may be controlled by a second switch 230. The second switch 230 controls power to the accessory 232. In one position, the power switch 220 may provide power to the accessory at 232. In a second position, power is not provided to the accessory at 234 but instead is available once the power switch 220 is actuated.

Figure 12:
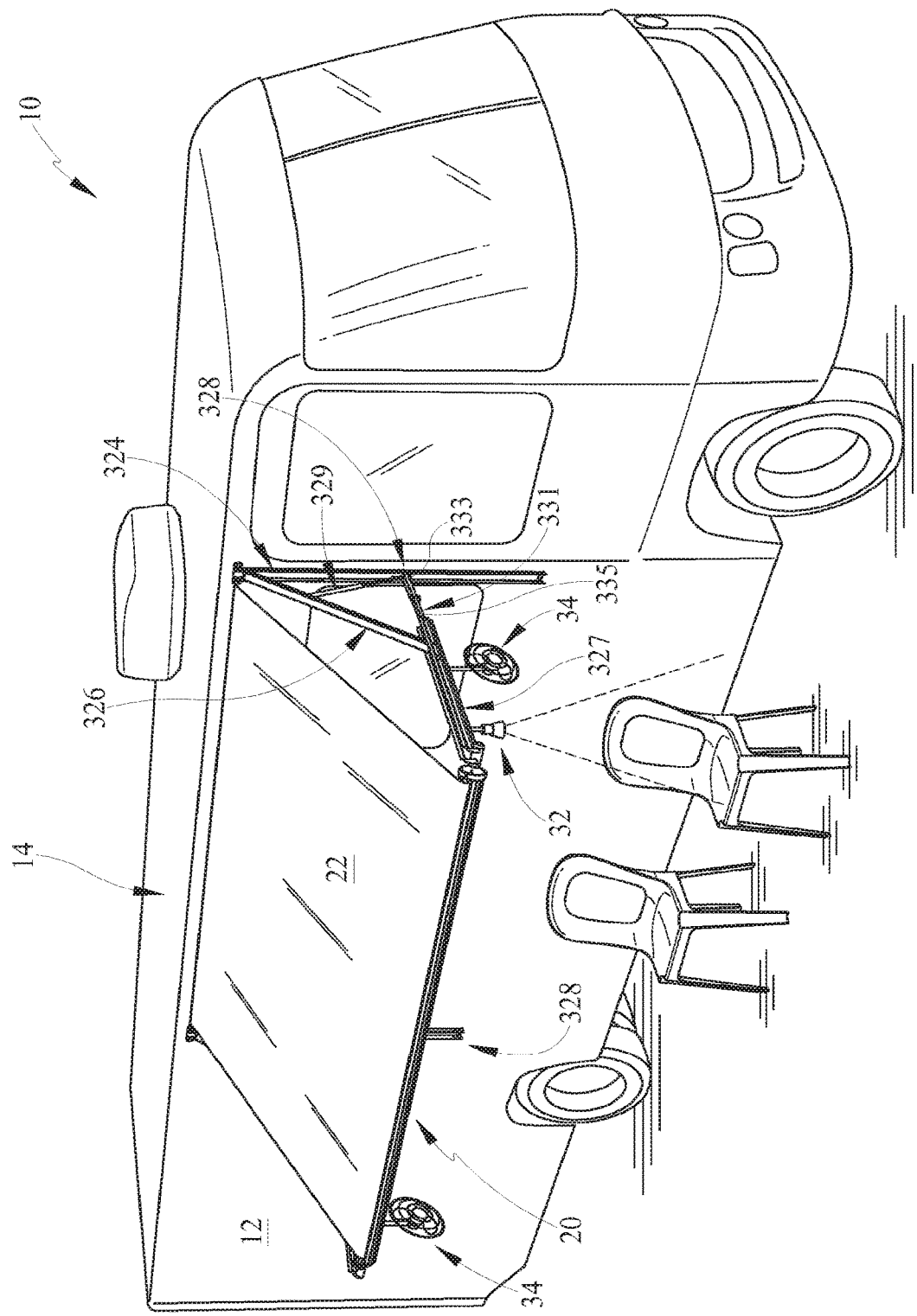
FIG. 12 is an isometric view of an alternate embodiment of the power track awning assembly.

Referring now to FIG. 12, an alternate embodiment of a power track awning assembly 30 is provided. Similar to the previous embodiment, the awning assembly 20 is connected to a sidewall 12 of a recreational vehicle (RV) 10. The sidewall 12 is connected to a vehicle roof 14 so that the awning assemblies may be extended, as shown in the figure, or retracted. In this embodiment, the hardware assembly 328 utilizes a power groove in order to power various accessory devices as distinguished from the roller tube having the power groove in the previous embodiments. The power groove of the instant embodiment may be located along various components of the hardware assembly.

The awning assembly 20 includes an awning or canopy 22 and first and second hardware assemblies 328 which connects the awning assembly 20 to the sidewall 12 of vehicle 10. The hardware assembly 328 supports the canopy 22 in the extended position (shown) and collapses to a compact, nested stack arrangement when the awning assembly 20 is retracted for road travel or when weather conditions preclude extended use of the awning assembly 20. In the retracted position, the hardware assemblies 328 are generally positioned in a vertical arrangement at lateral edges of the canopy 22 and along sidewall 12 of the RV 10. In the extended position depicted, portions of the hardware assemblies 328 extend outwardly from the RV sidewall 12.

Figure 10:
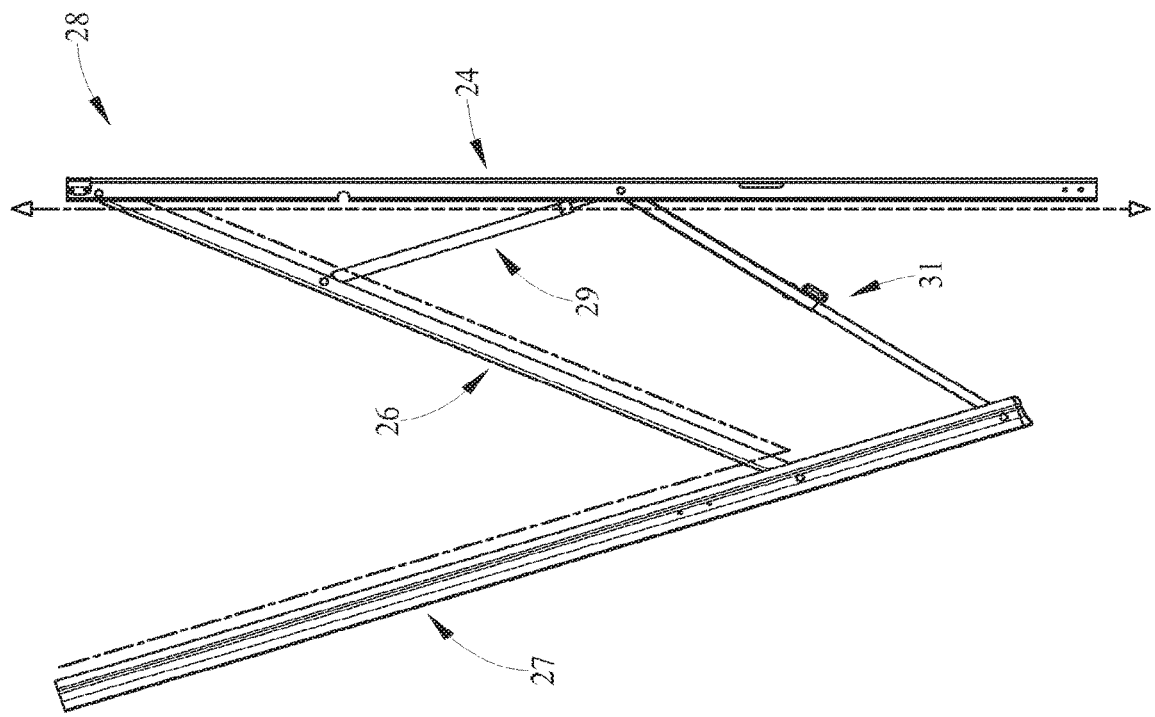
FIG. 10 a side view of an exemplary wire routing through a hardware assembly.
Figure 14:
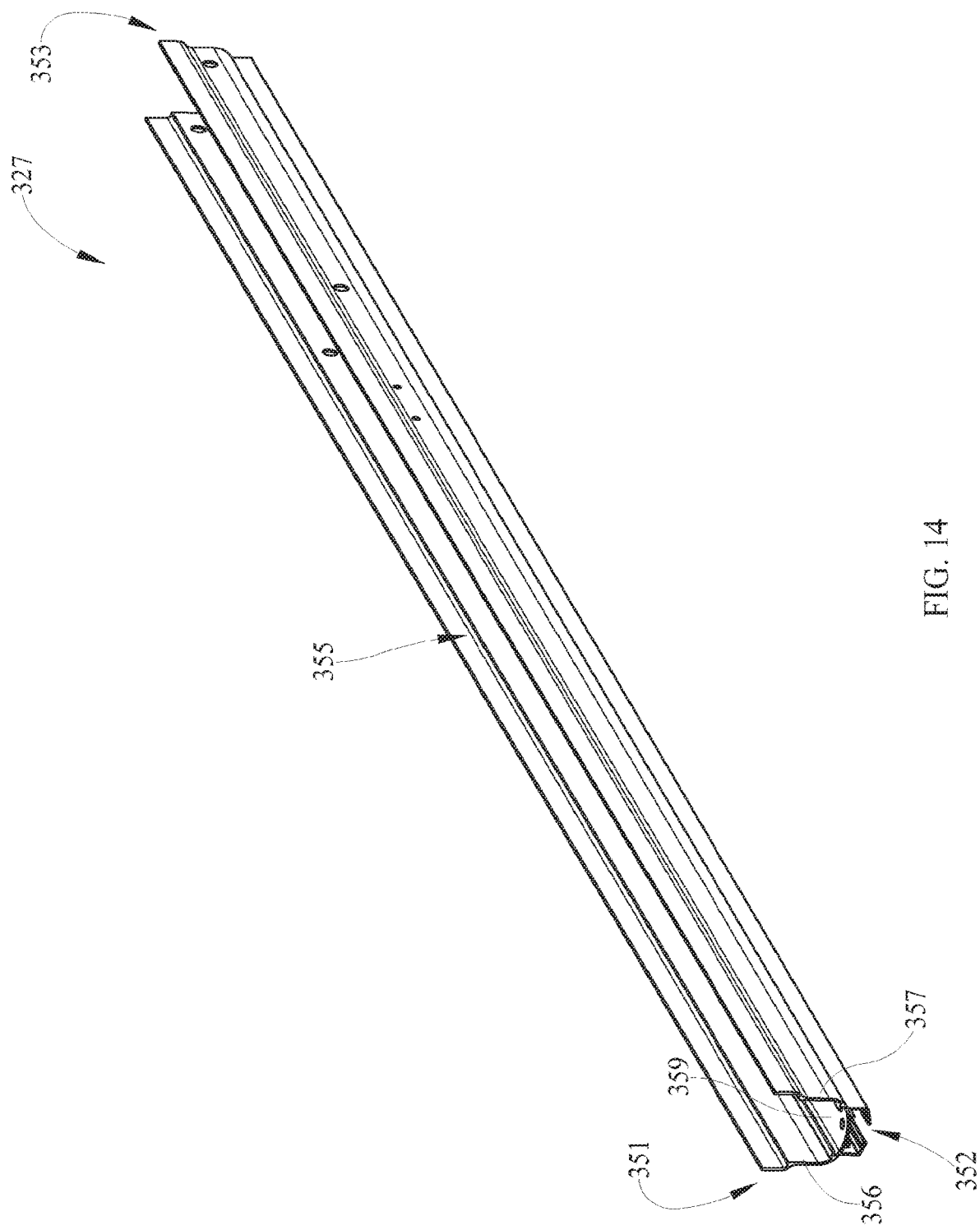
FIG. 14 is an isometric view of one component of the hardware assembly of FIG. 13.

The hardware assembly 328 also provides a path for wiring from a power source within the RV 10 to power the awning roller tube or to power an accessory which may be utilized with the awning assembly 20, as depicted in FIG. 10 for routing power to the power groove 352 (FIG. 14).

The hardware assembly 328 includes a plurality of arms wherein at least one of the arms includes the power groove 352 (FIG. 14). The hardware assemblies 328 form a four bar linkage comprising a first base arm 324, a second top arm 326, a third extending arm 327 and a fourth arm assembly 331 which may allow for pitch adjustment. While the present embodiment is depicted, one skilled in the art will realize that the power groove 352 may be utilized with other types of awning hardware and therefore, the instant embodiment is merely descriptive and not to be considered limiting.

The first base arm 324 is connected to the RV sidewall 12 and is channel-shaped having an open top which is capable of receiving a nested storage of the additional arms described in the following description of the hardware assembly. The first base arm 324 may be of a length so as to receive the additional arms in a compact nested arrangement so that those additional linkage arms do not extend from the bottom end of the first base arm 324. The channel shape is generally u-shaped and may have squared corners or rounded corners. Other shapes however may be utilized.

The first base arm 324 is straight and elongated and may be formed in various manners, including but not limited to an extrusion process. The first base arm 324 may be formed of a high strength lightweight material such as aluminum or aluminum alloy, among other materials. The channel shape comprises a main wall, a first side wall, and a second side wall defining the channel. The channel opening is outwardly facing so that the channel may receive the additional assembly arms when the awning assembly 20 is retracted.

The hardware assembly 328 further comprises a second top arm 326 which is pivotally connected to the first base arm 324 and extends at a second end to a third extended arm 327. The top arm 326 may also be formed of a high strength lightweight material such as aluminum alloy and may be formed in various fashions including, but not limited to, an extrusion process. Extending outwardly from the first base arm 324 is the adjustable arm assembly 331 which may allow adjustment of awning pitch, and the third extended arm 327. The third extended arm 327 may also be formed in various shapes including, but not limited to, a channel shape and provides for connection of various accessories such as the fan accessory 34 or a light accessory 32. Other audio or audio video accessories may be utilized in addition to the accessories depicted where such accessories may or may not need electrical communication for powering the device.

The adjustable arm assembly 331 extends from the base arm 324 and provides the capability to raise or lower corners of the awning assembly 20 disposed away from the RV sidewall 12. This adjustment of the corners allows independent raising or lowering of either end of the roller tube 50. Each adjustable arm assembly 331 includes a first member 333 and a second member 335 which slide relative to one another. Therefore, each adjustable arm assembly 331 may be adjusted to move and may be adjusted between an extended position and a collapsed position. Although the depicted embodiment provides for manual adjustment, it is contemplated that other mechanisms may be provided to provide automated adjustment. A lock or clamp may be provided to limit relative motion between the members 333, 335 when the adjustable arm assembly 331 is set at a desired configuration. The locked or secure position may be engaged, for example when extended, collapsed, or any position therebetween. Additionally, the unlocked position allows for manual adjustment to a desired configuration, at which time the lock may be engaged. The lock may be embodied by a lock knob, clamp, fastener-nut, latch, other movement limiting structure or combinations thereof. While an adjustment arm assembly 331 is described which is shown to have pitch adjustment capability for the awning roller tube, one of ordinary skill in the art may recognize that various other adjustable functions may be provided by adjustable arm assembly. Therefore, the adjustment arm assembly 331 should not be considered solely limited to pitch adjustment.

The hardware assembly 328 may further comprise a strut 329 which extends between the first base arm 324 and a second top arm 326. The strut 329 supports the second top arm 326 when the awning is in an extended or deployed position. The strut 329 further provides damping force for example, in windy conditions or during heavy rains. The strut 329 may be a gas strut, fluid strut or other suitable structure wherein the inner end of the strut 329 is connected to the base arm 324 and the outer end connects to the second top arm 326. The strut 329 may be provided with pivoting joints, such as pivotable ball end joints, or other connectors so that the strut 329 pivots and may be received within the base arm 324 when the awning assembly 20 is retracted. The joints or ends of the strut 329 may connect to a mounting bracket or other similar structure which is connected to the base arm 324 by various types of fasteners including, but not limited to, rivets or screws.

The strut 329 applies a force on the assembly 20 to provide an opposed force to any force which may be applied by water collecting on the canopy 22 or alternatively wind blowing against the canopy 22. For example, the strut 329 may also allow a corner of the awning assembly 320 to lower if the adjustable arm assembly 331 is unlocked or unsecured. Alternatively, when the loading of the water or wind is gone, the strut 329 allows the awning assembly 20 to return the lowered corner into the desired position.

Figure 13:
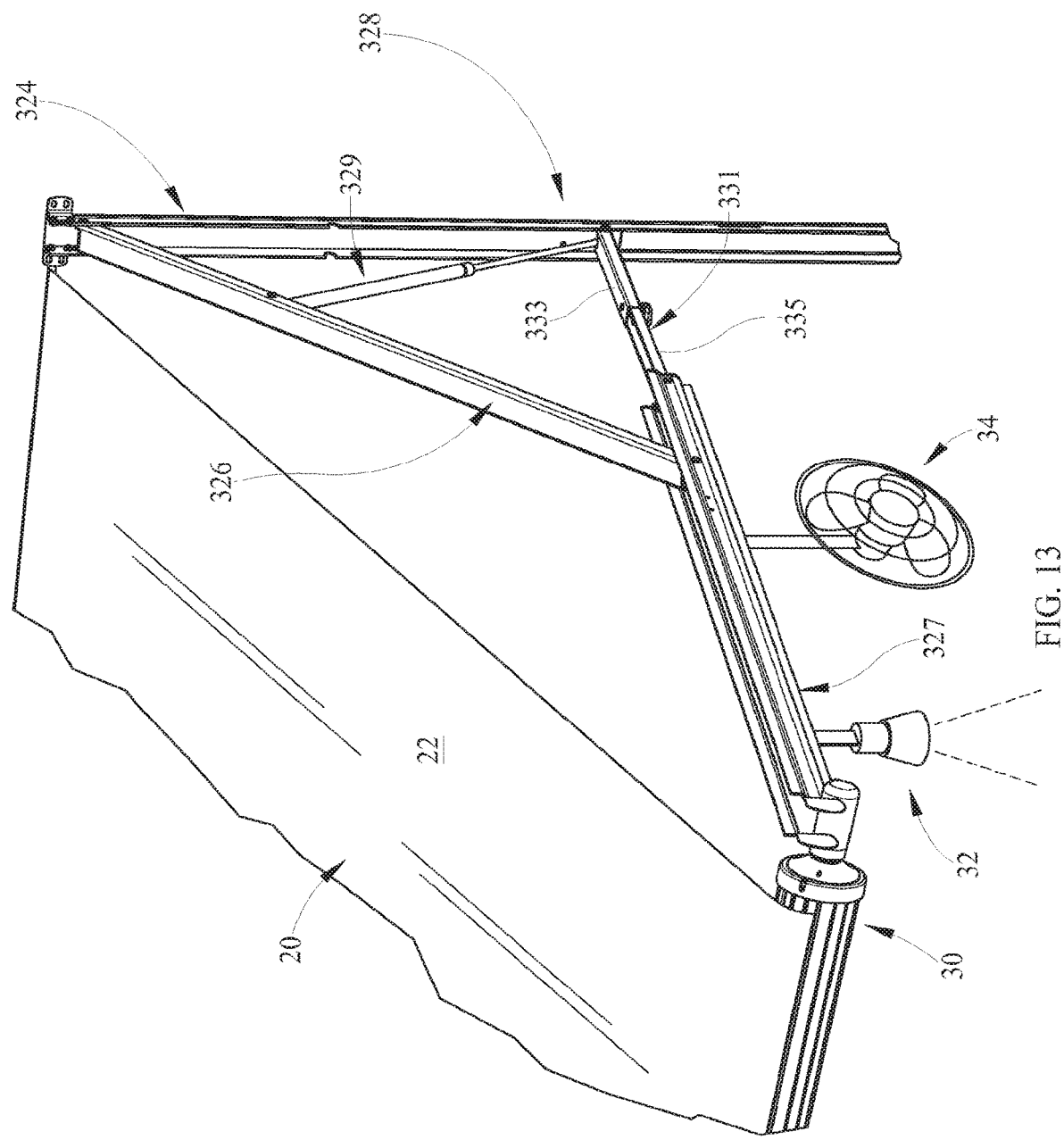
FIG. 13 is an isometric view of an exemplary hardware component of an exemplary hardware assembly having a power track.

Referring now to FIG. 13, an isometric detail view of the hardware 328 is depicted. The hardware assembly 328 is shown in more detail to aid in understanding. While one specific embodiment is shown for purpose of description, one skilled in the art should realize that the specific hardware assembly shown is not limiting and that other assemblies may be utilized with a power groove 352 (FIG. 14) described further herein.

The hardware assembly 328 includes the base arm 324 which connects the assembly 328 to a building or the RV sidewall 12 (FIG. 12). Further, the base arm 324 is shaped in a channel form to receive other components of the hardware assembly 328. At the upper end of the base arm 324 is the pivotally connected second top arm 326. The second top arm 326 pivots between the extended position shown corresponding to an extending awning canopy 22 and a retracted position wherein the top arm 326 is located within the base arm 324 and the canopy 22 is retracted.

Extending from a lower portion of the base arm 324 is the arm assembly 331 including a first member 333 and a second member 335. The end of the second member 335 farthest from the base arm 324 is connected to a third extended arm 327. In the instant embodiment, the third extended arm 327 includes the power groove 352 (FIG. 14) wherein the accessories 32, 34, 36 (FIG. 1) may be positioned. The third arm 327 is also channel shaped so that an open upper end of the arm 327 pivots toward the base arm 324 as the awning assembly 20 is retracted. As this occurs, the top arm 326 is hidden between the third arm 327 and the base arm 324.

The first and second members 333, 335 are slidable in an axial direction of the members relative to one another. When the arm assembly 331 is extended, the position of the end of the power track awning assembly 30 may be varied relative to the opposite end (not shown) of the power track awning assembly 30. Similarly, the members 333, 335 may be retracted to vary the pitch of the power track awning assembly 30 and the canopy 22. This functionality may also be provided at the opposite hardware assembly 328 so that the pitch of the canopy 22 may be changed to allow for drainage, for example, or allow of uneven deployment or retraction of the awning assembly 20. Once a desired position is achieved, in the extended configuration, the arm assembly 331 may be locked in various manners, for example a knob-lock assembly or other fastening structure.

Referring now to FIG. 14, an isometric view of the third extended arm 327 is depicted. A power groove 352 is shown formed with the extended arm 327 in the instant embodiment, as opposed to within the roller tube as in previous embodiments. The extended arm 327 includes a first end 351 and a second end 353. The cross-sectional shape of the arm 327 is channel-shaped having an open top 355 and side walls 356, 357 which meet at a base 359. One skilled in the art should realize that the power groove 352 may be formed on various of the arms 324, 326, 327, 331. The description of extended arms 327 is merely exemplary and should not be considered limiting.

Extending along the bottom surface of the base 359 is the power groove 352. The power groove 352 extends along the longitudinal length of the extended arm 327 between the first and second ends 351, 353. The power groove 352 is depicted as extending the entire length between the first and second ends 351, 353 but in alternative embodiments, may extend a partial length or in still further embodiments, may extend the entire length of the extended arm 327 but be formed in a discontinuous manner so that multiple power grooves 352 are located along the arm 327. Additionally, while the power groove 352 is shown on the third extended arm 327, the groove 352 may also be located on other components of the hardware assembly 328 or alternatively, may be located on other forms of awning assemblies for example the cassette style of FIGS. 9, 9A. For example, the power groove may be added to arms 124, 126.

Figure 15:
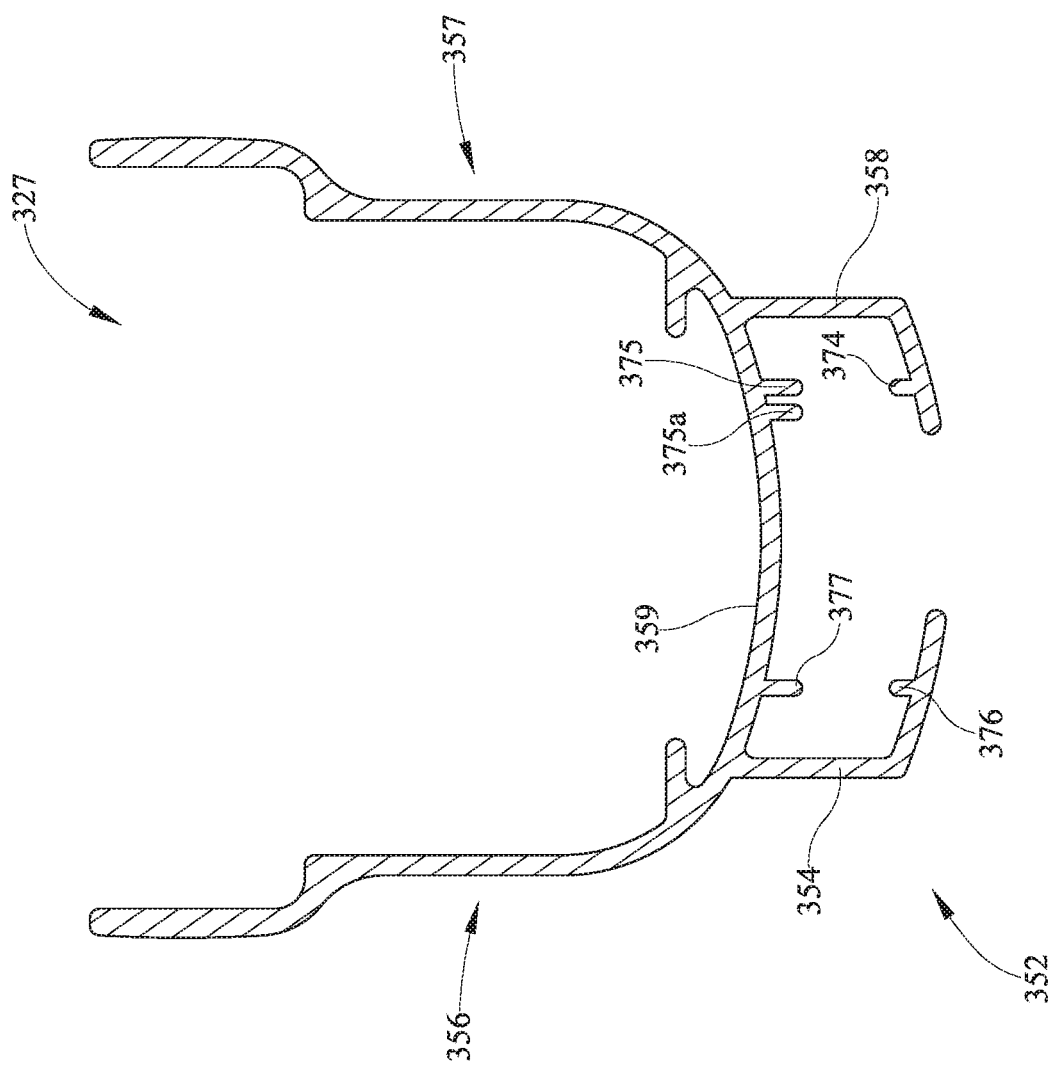
FIG. 15 is a section view of the exemplary hardware component having a power groove.

Referring now to FIG. 15, an end view of the extended arm 327 is depicted. The arm 327 comprises the first side wall 356 and second side wall 357 as well as the base 359, as previously described. The base 359 may be curved as depicted, or may be a substantially flat structure, according to other embodiments. The first and second side walls 356, 357 may have a flat or curved surface and may also be stepped as shown.

Additionally, the power groove 352 is shown depending from the lower surface of the base 359. The power groove 352 is comprised of a first L-shaped wall 354 and a second reverse L-shaped wall 358 providing a gap between lower most ends of the walls 351, 353 wherein a hand accessory base may be positioned.

As with the previous embodiment, the power groove 352 includes a plurality of locating ribs 374, 375, 376, 377. These locating ribs are utilized to locate and retain the first and second tracks 70, 72 (FIGS. 6, 16) which may be positioned within the power groove 352. The tracks 70, 72 may be formed as separate tracks or may alternatively be formed as a single track having multiple conductors as previously described. The additional locating rib 375a may be used to locate an electrical conductor strip 89 (FIG. 5A) in the same manner as previously described.

Figure 16:
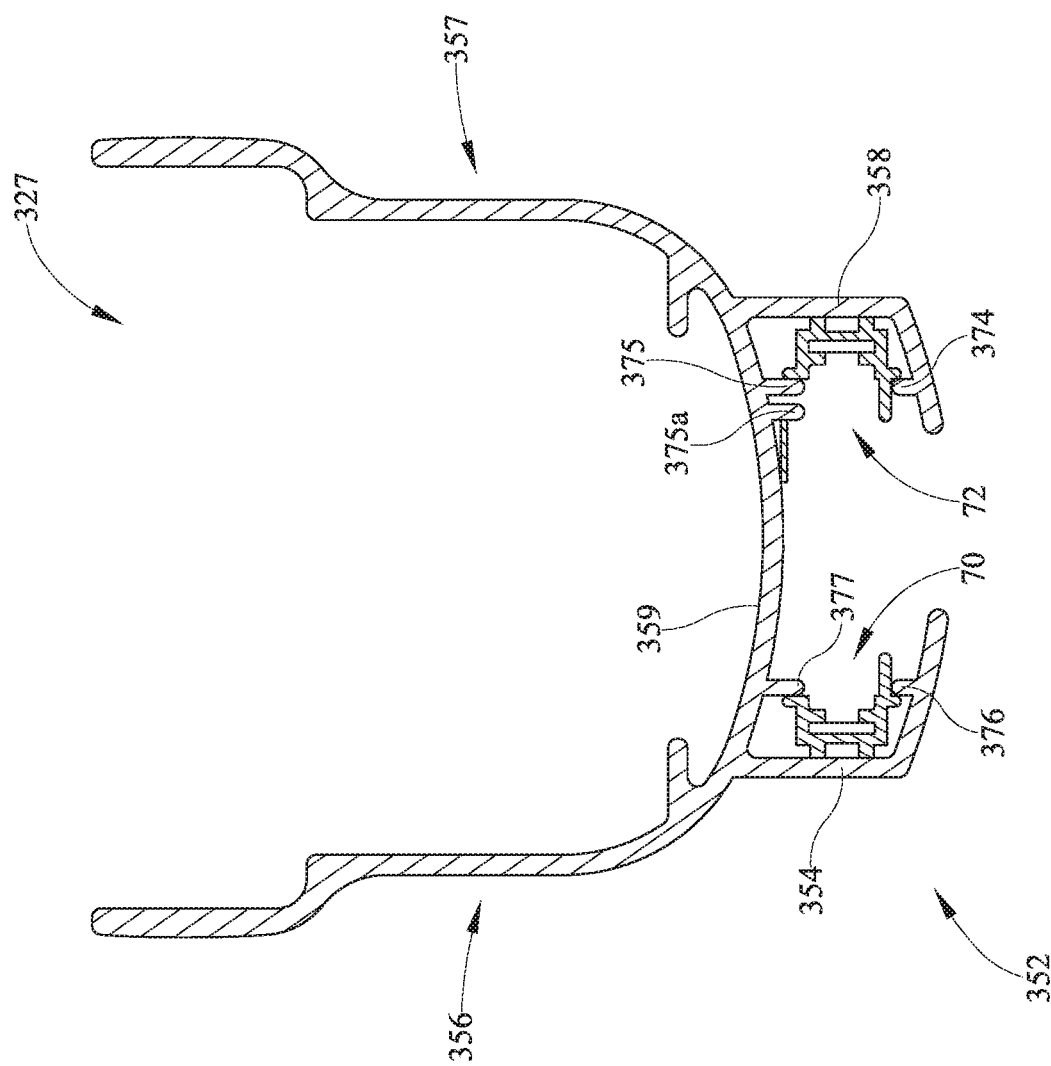
FIG. 16 is a section view of FIG. 15 further comprising at least one power track.

Referring now to FIG. 16, the section view of FIG. 15 is shown with the tracks 70, 72. The tracks 70, 72 are inserted in the power groove 352 at lateral sides and adjacent to the inner surfaces of the sidewalls 354, 358. As with the previous embodiments, the tracks 70, 72 have a plurality of locating ribs which interact with the walls 351, 353 and the locating ribs 374, 375, 376, 377 of the power groove 352.

Figure 17:
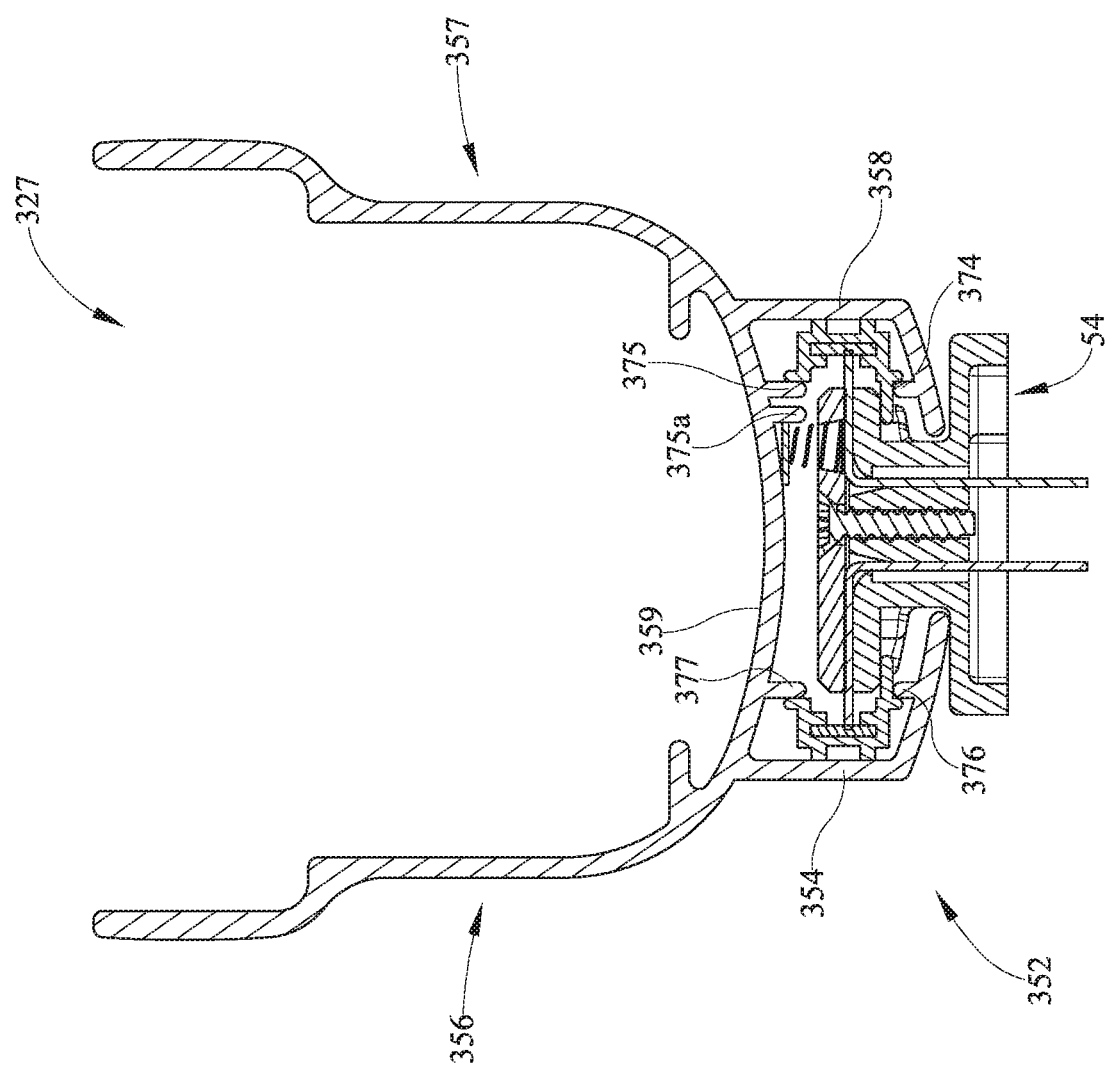
FIG. 17 is an additional section view of FIG. 16 further comprising an accessory base for powering an accessory disposed in the power groove.

Referring now to FIG. 17, an additional section view is depicted of the power groove 352 and the extended arm 327. An accessory base 54 is shown disposed within the power groove 352. As in the previous embodiment, the base 54 fits within the power groove 352 in one orientation and when rotated, for example 90 degrees, the base 54 is precluded from removal. In the depicted arrangement, the base 54 is rotated so as to engage the conductors within the tracks 70, 72 (FIG. 16). The base 54 may be used to power various accessories depicted.

Figure 18:
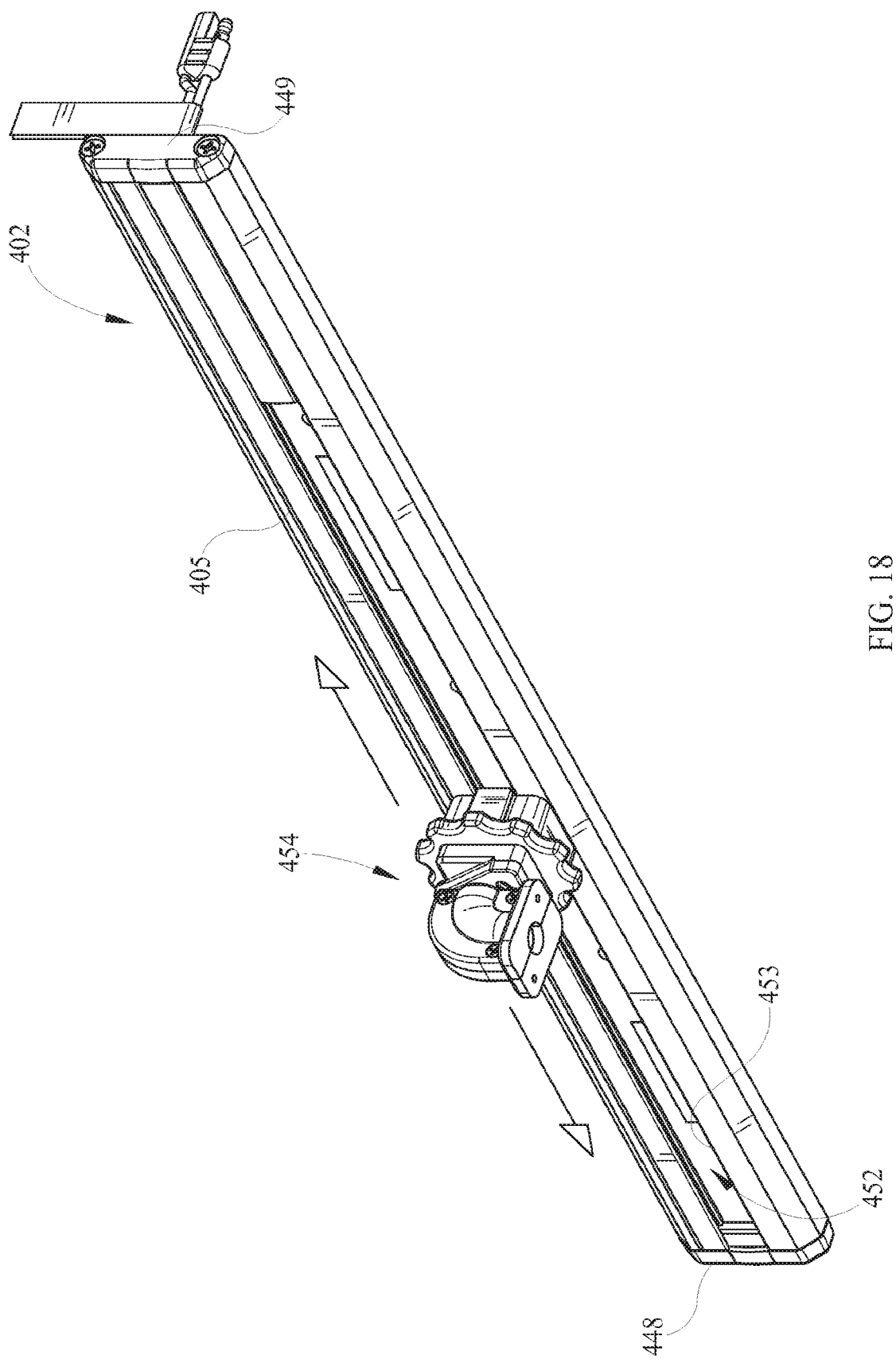
FIG. 18 a perspective view of the track housing and accessory base.

Referring now to FIG. 18, a perspective view of a track housing 402 and accessory base 454 is depicted. The accessory base 454, or alternate embodiments, may be used with various components including, but not limited to, the awning roller tube, the hardware assembly or the track housing 402, which may be mounted on a wall or ceiling within an RV or other fixed or mobile structure. The accessory base 454 may be moved through the track housing 402 to a desired location and to provide power to an accessory 32, 34, 36 which may include a fan, light, audio/video equipment such as a TV, monitor, smart tablet and/or speaker. The accessory base 454 provides a structure and path for low voltage power passing through the track housing 402 for powering the accessory 32, 34, 36. The track housing 402 includes a power groove 452 which is defined by one or more openings 453 extending longitudinally between the ends of the track housing 402. An indicating feature 405 may also extend longitudinally along the track housing 402. The indicating feature 405 provides a feature which indicates to an installer which edge or side of the track housing 402 should be up and which edge or side should be down. In some embodiments, the indicating feature 405 may be a groove or alternatively a rib. Still further, in some embodiments, the indicating feature 405 may also be engaged by the accessory base 454.

The track housing 402 of the instant embodiment is shown as a linear structure with first and second longitudinal ends. However, the structure is not limited to linear segments, as the structure may be curved or formed of a plurality of linear segments, plurality of curved segments or a combination thereof. The track housing 402 includes end caps 448, 449 which close the track housing 402 ends and prevent removal of the accessory base 454 from the longitudinal ends of the track housing 402.

Additionally, the accessory base 454 can be rotated within the track housing 402. The position which is depicted locks the accessory base 454 in a specific position relative to the track housing 402. However, by rotating the accessory base 454 about 90 degrees, the accessory base 454 may be removed from the track housing 402, as will be discussed later. This rotation for engagement or disengagement from a power groove, is similar to previously described embodiments used to engage or disengage conductors 84, 85.

Figure 19:
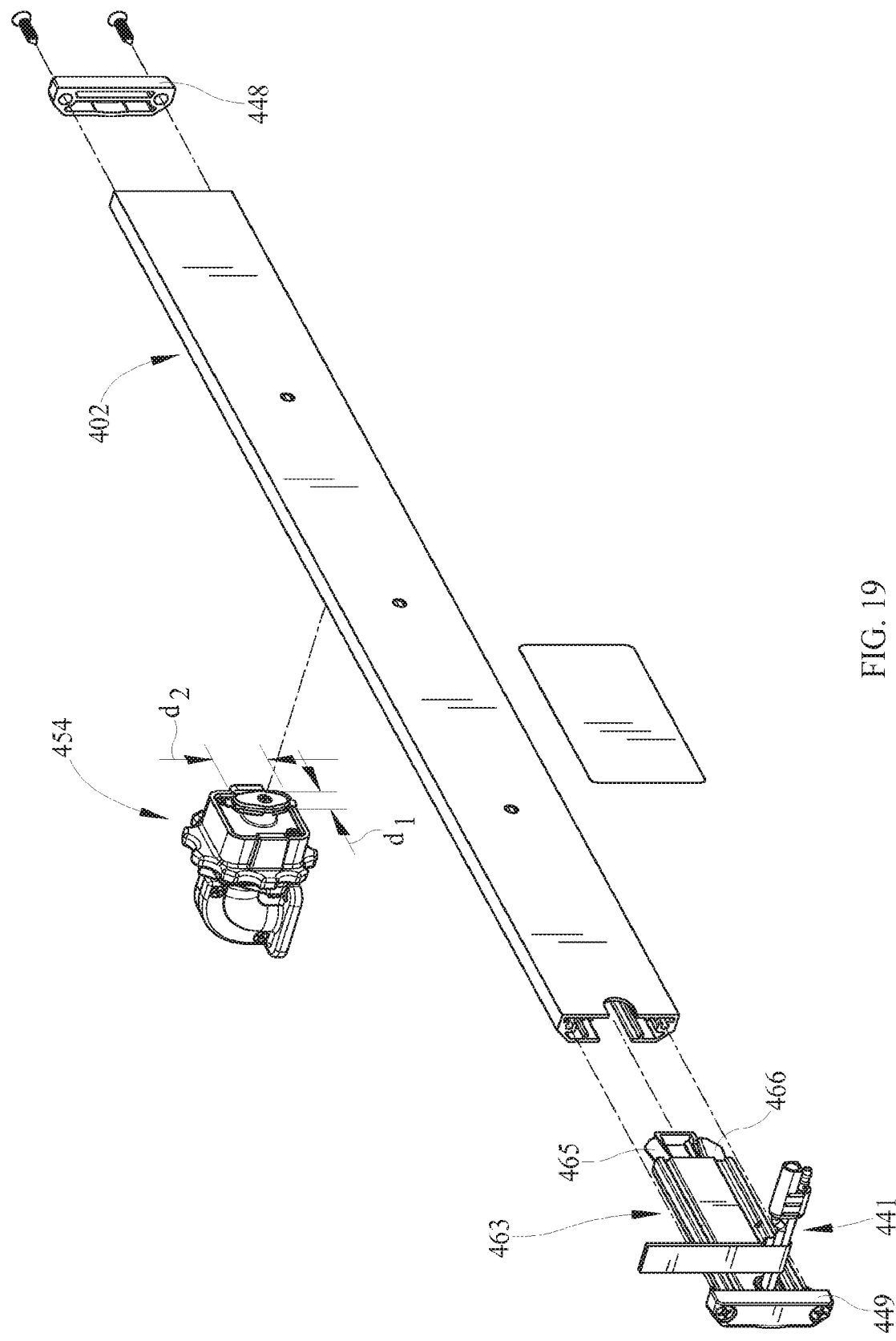
FIG. 19 is an end view of FIG. 18.

Referring now to FIG. 19, a rear exploded perspective view of the accessory base 454 and track housing 402 is depicted. In this view, the end caps 448, 449 are exploded from the longitudinal ends of the track housing 402. These structures may be fastened or otherwise connected by detents or other retaining structure to the track housing 402 at longitudinal ends thereof. The power-in feed cover 463 is positioned at the end of the track housing 402 or in the alternative, may be utilized with an awning roller tube as described within the previous embodiments. The power-in feed cover 463 includes conductors 465, 466 which may be in the form of blades providing a circuit with conductors located within the track housing 402. The power-in feed cover 463 receives low voltage power through at least one conductor or power wire 441. The power passes through the power-in feed cover 463 and the conductors or blades 465, 466 to the conductors 484, 485 (FIG. 24) within the track housing 402. The power-in feed cover 463 may be shaped to engage and/or fit between or around locating ribs located within the track housing 402 so that the power-in feed cover 463 is located properly within the track and seated for tightening with fasteners or other fastening structures.

Figure 20:
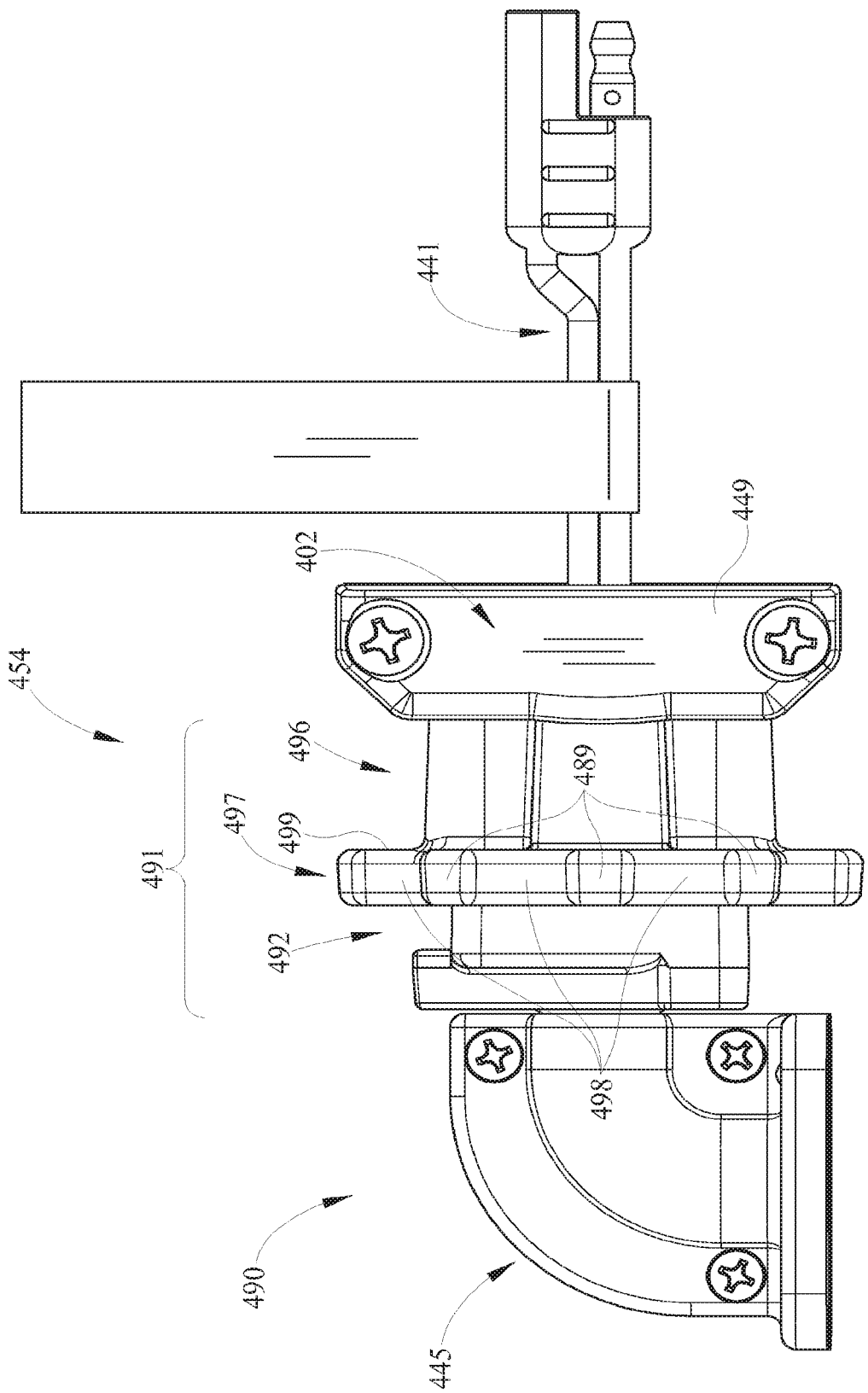
FIG. 20 is an exploded view of the accessory base.

Referring now to FIG. 20, an end view of the accessory base 454 is shown positioned in the track housing 402. The conductor power wire 441 is depicted extending from the track housing 402, and specifically the power-in feed cover 463 which is not visible in this view. The accessory base 454 is defined by a flange 490 having a body 491 and optionally, a conduit housing 445. In the previous embodiment, contacts are extended through the flange 90 to provide power. However, if wire conductors are preferable to engage an accessory, a conduit housing 445 may be desirable for use with the body 491 to allow passage of wires between the contacts within the body 491 and the powered accessory. The body 491 is formed of a first, outer flange body 496 and a second, inner flange body 492. According to some embodiments, the inner flange body 492 is fixed relative to the outer flange body 496 so that the outer flange body 496 can move along the outer surface of the inner flange body 492. However, in alternative embodiments, it is possible that an inner flange body 492 may be moveable relative to the outer flange body 496. The movement of the outer flange body 496 provides a way for the flange 490 to engage the track housing 402.

The outer flange body 496 also includes a grip 497. The grip 497 of the instant embodiment is formed of a plurality of curves or scallops 498, disposed between protuberances 489, such that the scallops 498 provide locations wherein user fingers may be positioned to apply torque and rotate the flange 490 during removal. Alternatively, during insertion, a user may grasp the inner flange body 492 and insert the power head 495 (FIG. 21) into the opening 453 (FIG. 18), and may or may not utilize the grip 497.

Additionally, the grip 497 creates a shoulder 499 so that the outer flange body 496 may be moved, relative to the inner flange body 492, away from the track housing 402.

As will be described later, the outer flange body 496 is biased in a direction toward the track housing 402 so that when force is removed from the shoulder 499, the natural position of the outer flange body 496 is toward or engaging the track housing 402.

The flange 490 includes a first side which is toward the body 491 and track housing 402 at an interface between the body 491 and track housing 402. The flange 490 also includes a second side which is spaced away from the track housing 402 and located at an end surface of the conduit housing 445. Alternatively, the second side may be located at the end of the body 491 if the optional conduit housing 445 is not utilized. The accessory base 454 receives low voltage power from the track housing 402 and electrical components at the first side 444 (FIG. 21) of the flange 490 and transmits the low voltage power to the second side 446 (FIG. 21) which may be the downwardly facing surface of the conduit housing 445.

Figure 21:
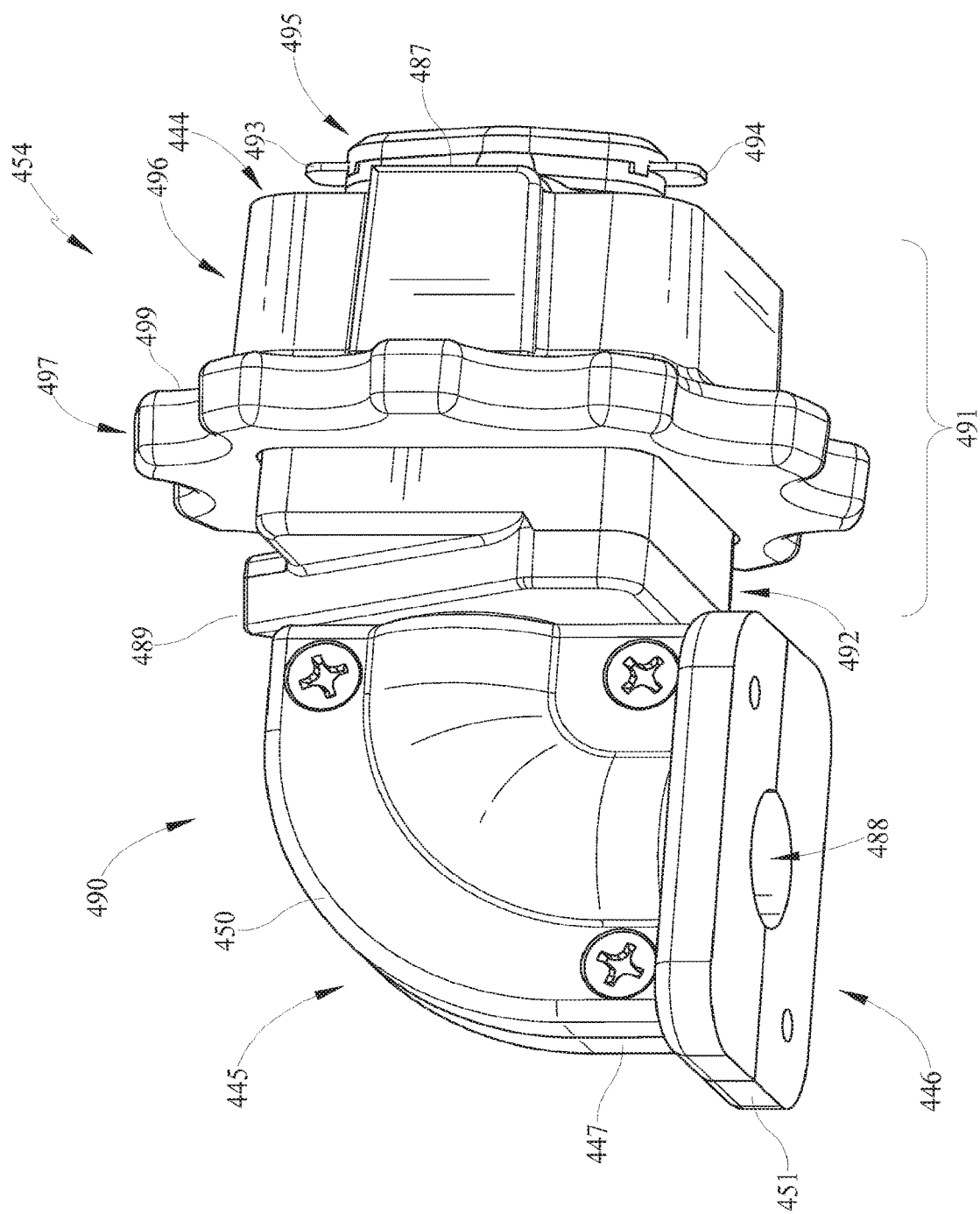
FIG. 21 is a perspective view of the accessory base.

Referring now to FIG. 21, a perspective view of the accessory base 454 is shown. The accessory base 454 is shown in an orientation wherein the structure would be mounted to the track housing 402 on a wall or in a power groove of an awning roller tube. At the left hand side of the figure, is the conduit housing 445. The conduit housing 445 is connected to the body 491 of the flange 490. According to some embodiments, the conduit housing 445 may be formed as an elbow which provides a mounting surface at second side 446 which is turned 90 degrees from a first side 444 of the body 491 that engages the track housing 402 or an awning roller tube surface. The conduit housing 445 may alternatively be formed in a manner so that the conductor wire may pass straight through rather than turning 90 degrees as depicted in the instant embodiment. In such embodiment, the first side 444 and second side 446 would be parallel or optionally may be at some angle other than 90 degrees depending on the needed orientation of the accessory. The conduit housing 445 is shown including three fasteners which clamp together two halves that define the conduit housing 445. The first and second housing halves 447, 450 include a lip 451 at the second side 446. This provides a mounting position for brackets or other structures which may be connected to the conduit housing 445 and need power. The two halves 447, 450 of the conduit housing 445 are formed with a hollow opening or path 488 for the conductor wire to pass from the body 491 through the conduit housing 445 to an accessory utilizing low voltage power.

The inner flange body 492 is positioned adjacent to the conduit housing 445. At the end of the inner flange body 492 closest to the conduit housing 445, there is a molded indicator 489. The indicator 489 is molded in the form of an arrow or a point to indicate to a user the correct direction of orientation of the accessory base 454 when mounted in a track housing 402 or in an awning roller tube. Various shapes may be utilized to represent the indicator 489 with the goal being to notify the user of the correct position and orientation of the accessory base 454. The indicator 489 is desirable because of the polarity of the power and that according to some embodiments a contact 493 is longer than 494. The contacts 493, 494 must be oriented correctly for proper polarity and operation.

Moving to the right of the indicator 489, the inner flange body 492 extends horizontally in the orientation depicted. Each of the four walls extend into the outer flange body 496. The inner flange body 492 and outer flange body 496 have corresponding shapes that allow the inner flange body 492 to fit within the outer flange body 496. The outer flange body 496 and inner flange body 492 are generally square shaped in cross section. However, this is an exemplary embodiment and alternative shapes may be used so that one of the flange bodies 496, 492 may move relative to the other. This construction allows for the outer flange body 496 to slide along the inner flange body 492. The outer flange body 496 may move from the position depicted horizontally, toward the left in the depicted orientation, toward the indicator 489. When the grip structure 497 engages the indicator 489, the outer flange body 496 is stopped from further motion. Alternatively, internal stops or other structures may be utilized to limit the movement of the outer flange body 496.

At the right hand end of the outer flange body 496 is at least one tab 487. The tab 487 extends beyond the edge of the outer flange body 496 closest to a power head 495. In some embodiments, when the power head 495 is disposed in the awning roller tube, the hardware assembly or the track housing 402, the tab 487 may extend into the opening 453

(FIG. 18) of the power groove 452 (FIG. 18). This inhibits rotation of the accessory base 454 relative to the track, awning or hardware. In some other embodiments, the tab 487 may be positioned to engage a groove, for example the indicating feature 405 (FIG. 18) in the track housing 402, so that the accessory base 454 has positive engagement with track housing 402 and also cannot move or twist once the tab 487 engages the indicating feature 405. In alternate embodiments, the structure may be reversed so that a tab or rib extends from the track housing 402, awning roller tube or hardware assembly and a groove or other female engagement part may be formed on the body 491 to resist twisting or movement of the accessory base 454 once positioned positively in the track housing 402.

Also shown in the depicted view, at the right hand end of the accessory base 454 is the power head 495 having the first and second contacts 493, 494. As in the previous embodiment, the contacts 493, 494 are generally L-shaped. Further, the power head 495 is un-centered and therefore one of the contacts 493 is longer than the other contact 494 so as to have the appropriate geometry for engagement with conductors 484, 485 (FIG. 24) within the track housing 402.

Referring now to FIGS. 22 and 23, the function of the grip 497 and shoulder 499 may be depicted to describe the function. With reference first to FIG. 22, the track housing 402 is shown adjacent to the accessory base 454. The outer flange body 496 is engaging the track housing 402 due to the outer flange body 496 being biased toward the track housing 402. The grip 497 extends from the outer flange body 496 defining the shoulder 499. In order to disengage the accessory base 454 from the track housing 402, the outer flange body 496 is pulled away by gripping the shoulder 499 from the track housing 402 as shown by the large arrow in FIG. 23. According to some instant embodiments, this movement is against a biasing force internal to the body 491. As shown in FIG. 23, with the outer flange body 496 moved, the tabs 487 are shown adjacent to the surface of the track housing 402. Once the outer flange body 496 is moved to the position shown in FIG. 23, the grip 497 may be utilized to rotate the accessory base 454 about a horizontal axis extending through the inner and outer flange bodies 492, 496 and through the track housing 402. As described previously, once rotated, the accessory base 454 may be removed from the track housing 402.

Figure 24:
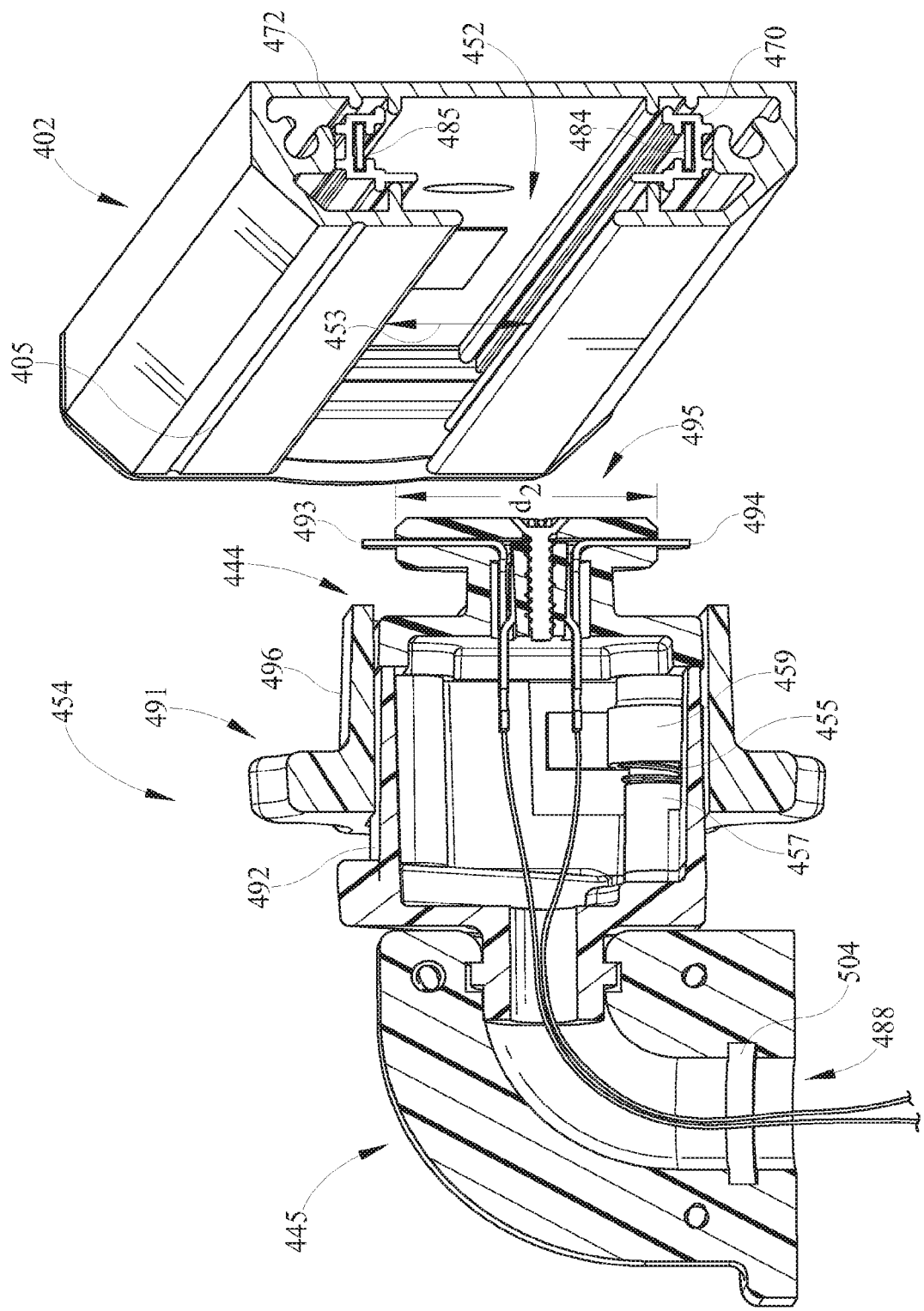
FIG. 24 a section view of the accessory base removed from the track housing.

Referring now to FIG. 24, a section perspective view of the accessory base 454 is shown where the accessory base is removed from the track housing 402. As shown in the depicted embodiment, the accessory base 454 is sectioned revealing the interior of the assembly. The body 491 is shown formed with the inner flange body 492 extending into the outer flange body 496. The power head 495 is shown extending into the outer flange body 496 and abutting the inner flange body 492. Extending from the power head 495 are the first and second contacts 493, 494 which engages the track conductors 484, 485. As shown in the view, the opening 453 of the power groove 452 is sized such that the dimension $d_2$ of the power head 495 is greater than the dimension of the opening 453. However, with brief reference to FIGS. 7 and 19, the power head 495 has a second dimension $d_1$ which is less than the dimension of opening 453 so that when the accessory base 454 is rotated, the power head 495 will fit through the opening 453 of the power groove 452 and once positioned therein, subsequent rotation of the accessory base 454 and power head 495 causes engagement of the contacts 493, 494 with conductors 485, 484, respectively.

Also depicted in the embodiment are the structures which allow movement of one portion of the flange body relative to the other. As previously noted, in some embodiments the outer flange body 496 moves relative to the inner flange body 492. However, alternate embodiments may be utilized wherein the inner structure moves relative to the outer or more generally, that a first structure moves relative to a second structure.

Within a cavity of the body 491, a spring 455 is positioned therein. As previously described, the outer flange body 496 is biased relative to the inner flange body 492. In the depicted embodiment, the structure is biased in the right hand direction so that the outer flange body 496 engages the track housing 402. Various biasing structures may be utilized to bias one of the flange bodies toward or away from the other. In the instant embodiment, the spring 455 is positioned on a mount 457 at one end and seat 459 on the opposite end. The mount 457 is molded integrally with the inner flange body 492 and the seat 459 is formed with the outer flange body 496 and extends through an opening in the inner flange body 492. In this construction, one of the flange bodies may move relative to the other in guided fashion and also be biased. Due to the section shown only one spring is shown. However multiple spring may be used to equalize the force acting within the body 491.

The power head 495 may be fastened or otherwise connected to the inner flange body 492 so that movement of the outer flange body 496 does not affect the power head 495.

As depicted additionally in the embodiment, the track housing 402 is shown in section view. The track housing 402 includes at least one track 470, 472. The tracks 470, 472 may be the same as the previous embodiments such that the locating tabs or ribs 405 may be used on either or both of the track housing 402 and/or the tracks 470, 472. Additionally, located within the tracks are conductors 484, 485.

Figure 25:
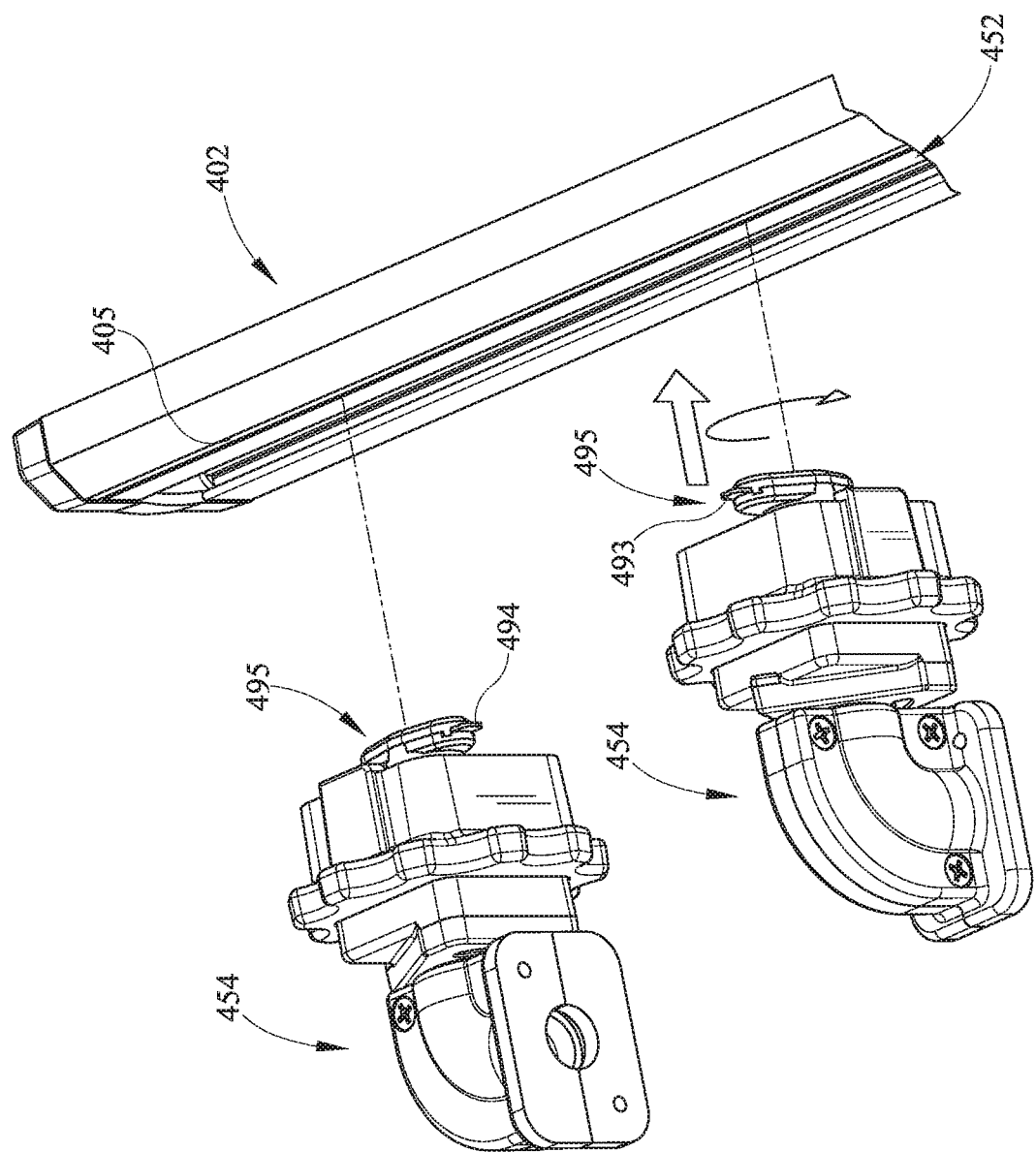
FIG. 25 a perspective view is depicted of the accessory base in two orientations; and, FIG. 26 is a perspective view of the track housing and accessory base with an additional accessory.

Referring now to FIG. 25, a perspective view is depicted of the accessory base 454 in two orientations. In the upper orientation, the power head 495 is oriented so that a long dimension of the power head 495 in the measured $d_2$ direction (FIG. 24) is positioned to move into the power groove 452. Once inserted, the accessory base 454 is rotated some arcuate distance. In the exemplary embodiment, the rotation is 90 degrees as shown in the lower embodiment of the accessory base 454 of FIG. 25. This moves the contacts 493, 494 from extending horizontally to extending vertically and allows engagement with the conductors 484, 485 (FIG. 24) of the track housing 402.

Figure 26:
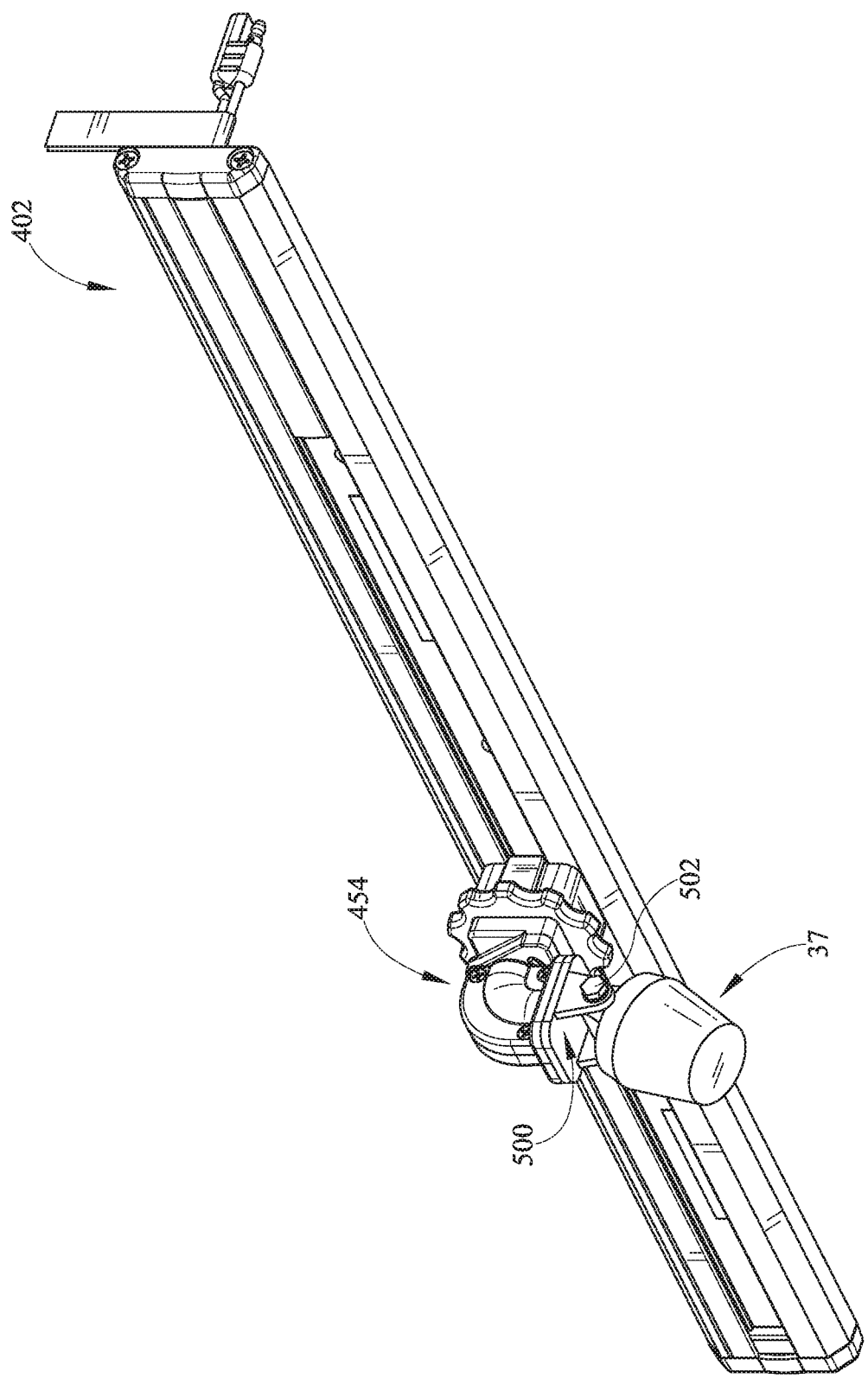

Referring now to FIG. 26, a track housing 402 and accessory base 454 are shown with an additional accessory, for example a speaker 37. A speaker of the embodiment may be, for example, a Bluetooth speaker requiring power to operate without an amplifier. The accessory base 454 is shown connected to a bracket 500. The bracket 500 provides for rotation of the speaker 37 at the bolted connection about a horizontal axis 502. Additionally, the structure may be formed to allow for rotation about a vertical axis. With brief reference to FIG. 24, the bracket 500 may include a post which engages a swivel point 504 and allows for rotation about the vertical axis so that the speaker 37 may be adjusted about two axes to improve listening enjoyment. Additionally, such bracket structure may be utilized for a fan, light or other audio/video needs for accessory embodiments previously described, and other such power accessories which may not be described but are included within the scope of the present description.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An accessory base for use with a powered accessory, comprising:
   a flange having an inner flange body and an outer flange body which moves relative to said inner flange body, a first side and a second side, a first contact and a second contact each of said contacts having a first end and a second end, said first and second contacts extending into said flange;
   a grip extending from said outer flange body to move said outer flange body relative to said inner flange body;
   a power head spaced from said inner flange body at said first side of said flange;
   said first contact and said second contact, which are the only accessory base contacts, extending through said power head;
   said power head having a first dimension and a second dimension, one of said first or second dimensions being capable of fitting into a power groove of an adjacent component and the other of said first or second dimensions being capable of retaining said power head in said power groove when said power head is rotated;

wherein said first contact and said second contact extend from said power head and wherein said power head and first and second contacts are capable of rotation relative to said power groove solely in one direction for electrical communication with said power groove;

wherein said power head is unsymmetrical relative to an axis of rotation of said power head;

at least one portion of said flange being movable to disengage said adjacent component;

said flange being connectable to said powered accessory for powering by said power groove.

2. The accessory base of claim 1 wherein said first contact and said second contact are substantially L-shaped.

3. The accessory base of claim 1, wherein said outer flange body is biased to a first of two positions closest to the adjacent component.

4. The accessory base of claim 3, wherein said adjacent component is one of a track housing, a hardware assembly, awning roller tube or a cassette awning assembly.

5. The accessory base of claim 1, further comprising tabs extending from one of the inner or the outer flange body for engagement of said adjacent component.

6. The accessory base of claim 1 wherein said powered accessory is a light.

7. The accessory base of claim 1 wherein said powered accessory is a fan.

8. The accessory base of claim 1 wherein said powered accessory includes at least one of an audio or video accessory.

9. The accessory base of claim 1 further comprising at least one track within an awning assembly.

10. The accessory base of claim 1 wherein said power groove comprises at least one track including a first conductor and a second conductor.

11. An accessory base for use with powered accessory, comprising:
a flange having a first side and a second side, said flange further comprising an outer flange body and an inner flange body wherein said outer flange body is configured to move relative to said inner flange body;
a grip to aid rotation of said flange, said grip connected to said outer flange body and said outer flange body being movable with said grip;
a power head extending from said flange;
said grip extending from said flange, said grip being movable toward and away from said power head;
a first contact extending from said power head and a second contact extending from said power head, said first and second contacts extending into said flange, said first and second contacts being the only contacts of the accessory base for electrical communication;
said power head having a first dimension which is less than a second dimension, said first dimension allowing passage through a power groove;
wherein said power head and first and second contacts are capable of rotating in only one direction relative to said power groove for electrical communication, and wherein said contacts are unsymmetrical relative to an axis about which said power head and said first and second contacts rotate; a conduit housing disposed at one of said first side and said second side of said flange.

12. The accessory base of claim 11, wherein said conduit housing has an elbow shape, which changes direction between a first side and a second side.

13. The accessory base of claim 11, wherein said second side and said first side are at non-parallel angles.

14. The accessory base of claim 11 further comprising a cavity in said flange.

15. The accessory base of claim 14 further comprising conductors disposed within said cavity and extending from said first and second contacts through said conduit housing.

16. The accessory base of claim 11, wherein said accessory base is mountable in at least one of an awning roller tube, a hardware assembly, a cassette awning assembly and a track housing.

* * * * *